(12) United States Patent
Taquet et al.

(10) Patent No.: US 12,417,555 B2
(45) Date of Patent: Sep. 16, 2025

(54) METHOD AND APPARATUS OF ENCODING/DECODING POINT CLOUD GEOMETRY DATA SENSED BY AT LEAST ONE SENSOR

(71) Applicant: Beijing Xiaomi Mobile Software Co., Ltd., Beijing (CN)

(72) Inventors: Jonathan Taquet, Beijing (CN); Sebastien Lasserre, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 18/695,737

(22) PCT Filed: Jun. 21, 2022

(86) PCT No.: PCT/CN2022/100238
§ 371 (c)(1),
(2) Date: Mar. 26, 2024

(87) PCT Pub. No.: WO2023/050912
PCT Pub. Date: Apr. 6, 2023

(65) Prior Publication Data
US 2025/0131597 A1    Apr. 24, 2025

(30) Foreign Application Priority Data
Sep. 30, 2021 (EP) .................... 21306360

(51) Int. Cl.
*G06T 9/00* (2006.01)
*H04N 19/597* (2014.01)
*H04N 19/91* (2014.01)

(52) U.S. Cl.
CPC ............. *G06T 9/00* (2013.01); *H04N 19/597* (2014.11); *H04N 19/91* (2014.11)

(58) Field of Classification Search
CPC ......... G06T 9/00; G06T 9/001; H04N 19/597; H04N 19/91
See application file for complete search history.

(56) References Cited

U.S. PATENT DOCUMENTS

| | | | |
|---|---|---|---|
| 8,831,366 B1 * | 9/2014 | Hickman | ................ G06T 15/80 |
| | | | 382/232 |
| 2003/0108099 A1 * | 6/2003 | Nagumo | ................... G06T 9/20 |
| | | | 375/E7.199 |

FOREIGN PATENT DOCUMENTS

WO    WO 2021084295 A1    5/2021

OTHER PUBLICATIONS

European Patent Office, Extended European Search Report issued in Application No. 21306360.5 dated Feb. 25, 2022, 14 pages.

(Continued)

*Primary Examiner* — Joseph Suh
(74) *Attorney, Agent, or Firm* — Finnegan, Henderson, Farabow, Garrett & Dunner, L.L.P.

(57) ABSTRACT

A method of encoding, into a bitstream, point cloud geometry data represented by ordered coarse points occupying some discrete positions of a set of discrete positions of a two-dimensional space, includes: encoding, into the bitstream, a data ($S_{next}$) indicating if an occupied coarse point ($P_{next}$) associated with a point of the point cloud is a late occupied coarse point; and if the data ($S_{next}$) indicates that the occupied coarse point is a late occupied coarse point ($P_{next}$), obtaining a late point order index difference ($\Delta o_{late}$) between an order index of the late occupied coarse point ($P_{next}$), and an order index of a second reference coarse point ($P'_{ref}$); and encoding, into the bitstream, an amplitude of the late point order index difference.

18 Claims, 13 Drawing Sheets

(56) References Cited

OTHER PUBLICATIONS

ISO/IEC JTC 1/SC 29/WG 7, N00167, MPEG 3D Graphics Coding, Convenorship: AFNOR (France), "Technologies under Consideration in G-PCC", https://isotc.iso.org/livelink/livelink/open/jtc1sc29wg7, Aug. 31, 2021, 44 pages.

S. Lasserre, J. Taquet, "m57073 [GPCC-EE13.53] Algorithmic explanation of the new Lidar Codec LL-LC2", Xiaomi, Oct. 6, 2021, 37 pages.

* cited by examiner

METHOD AND APPARATUS OF ENCODING/DECODING POINT CLOUD GEOMETRY DATA SENSED BY AT LEAST ONE SENSOR

CROSS-REFERENCE TO RELATED APPLICATION

This application is a US national phase application of International Application No. PCT/CN2022/100238, filed on Jun. 21, 2022, which claims a priority to and benefits of European Patent Application Serial No. 21306360.5, filed on Sep. 30, 2021, the entire contents of which are incorporated herein by reference for all purposes.

FIELD

The present application generally relates to point cloud compression and, in particular to methods and apparatus of encoding/decoding point cloud geometry data sensed by at least one sensor.

BACKGROUND

As a format for the representation of 3D data, point clouds have recently gained traction as they are versatile in their capability in representing all types of physical objects or scenes. Point clouds may be used for various purposes such as culture heritage/buildings in which objects like statues or buildings are scanned in 3D in order to share the spatial configuration of the object without sending or visiting it. Also, it is a way to ensure preserving the knowledge of the object in case it may be destroyed; for instance, a temple by an earthquake. Such point clouds are typically static, colored and huge.

Another use case is in topography and cartography in which using 3D representations allow for maps that are not limited to the plane and may include the relief. Google Maps is now a good example of 3D maps but uses meshes instead of point clouds. Nevertheless, point clouds may be a suitable data format for 3D maps and such point clouds are typically static, colored and huge.

Virtual Reality (VR), Augmented Reality (AR) and immersive worlds have recently become a hot topic and are foreseen by many as the future of 2D flat video. The basic idea is to immerse the viewer in a surrounding environment, in contrast to a standard TV that only allows the viewer to look at the virtual world in front of him/her. There are several gradations in the immersivity depending on the freedom of the viewer in the environment. A point cloud is a good format candidate for distributing VR/AR worlds.

The automotive industry, and more particularly foreseen autonomous cars, are also domains in which point clouds may be intensively used. Autonomous cars should be able to "probe" their environment to make good driving decisions based on the detected presence and nature of their immediate nearby objects and road configuration.

A point cloud is a set of points located in a three-dimensional (3D) space, optionally with additional values attached to each of the points. These additional values are usually called attributes. Attributes may be, for example, three-component colors, material properties like reflectance and/or two-component normal vectors to a surface associated with a point.

A point cloud is thus a combination of geometry data (locations of the points in a 3D space usually represented by 3D cartesian coordinates x,y and z) and attributes.

Point clouds may be sensed by various types of devices like an array of cameras, depth sensors, lasers (light detection and ranging, also known as Lidars), radars, or may be computer-generated (for example in movie post-production). Depending on the use cases, points clouds may have from thousands to up to billions of points for cartography applications. Raw representations of point clouds require a very high number of bits per point, with at least a dozen of bits per cartesian coordinate x, y or z, and optionally more bits for the attribute(s), for instance three times 10 bits for the colors.

It is important in many applications to be able to either distribute point clouds to an end-user or store them in a server by consuming only a reasonable amount of bitrate or storage space, while maintaining an acceptable (or preferably very good) quality of experience. Efficient compression of these point clouds is a key point in order to make the distribution chain of many immersive worlds practical.

Compression may be lossy (like in video compression) for the distribution to and visualization by an end-user, for example on AR/VR glasses or any other 3D-capable device. Other use cases do require lossless compression, like medical applications or autonomous driving, to avoid altering the results of a decision obtained from the subsequent analysis of the compressed and transmitted point cloud.

Until recently, point cloud compression (aka PCC) was not addressed by the mass market and no standardized point cloud codec was available. In 2017, the standardization working group ISO/JCT1/SC29/WG11, aka Moving Picture Experts Group or MPEG, has initiated work items on point cloud compression. This has led to two standards, namely MPEG-I part 5 (ISO/IEC 23090-5) or Video-based Point Cloud Compression (aka V-PCC) MPEG-I part 9 (ISO/IEC 23090-9) or Geometry-based Point Cloud Compression (aka G-PCC)

The V-PCC coding method compresses a point cloud by performing multiple projections of a 3D object to obtain 2D patches that are packed into an image (or a video when dealing with dynamic point clouds). Obtained images or videos are then compressed using already existing image/video codecs, allowing for the leverage of already deployed image and video solutions. By its very nature, V-PCC is efficient only on dense and continuous point clouds because image/video codecs are unable to compress non-smooth patches as would be obtained from the projection of, for example, Lidar-sensed sparse geometry data.

The G-PCC coding method has two schemes for the compression of a sensed sparse geometry data.

The first scheme is based on an occupancy tree, being locally any type of tree among octree, quadtree or binary tree, representing the point cloud geometry. Occupied nodes (i.e. a node associated with a cube/cuboid comprising at least one point of the point cloud) are split down until a certain size is reached, and occupied leaf nodes provide the 3D locations of points, typically at the center of these nodes. The occupancy information is carried by occupancy data (binary data, flag) signaling the occupancy status of each of the child nodes of nodes. By using neighbor-based prediction techniques, high level of compression of the occupancy data can be obtained for dense point clouds. Sparse point clouds are also addressed by directly coding the position of point within a node with non-minimal size, by stopping the tree construction when only isolated points are present in a node; this technique is known as Direct Coding Mode (DCM).

The second scheme is based on a predictive tree in which each node represents the 3D location of one point and the parent/child relation between nodes represents spatial prediction from parent to children. This method can only address sparse point clouds and offers the advantage of lower latency and simpler decoding than the occupancy tree. However, compression performance is only marginally better, and the encoding is complex, relatively to the first occupancy-based method, because the encoder must intensively look for the best predictor (among a long list of potential predictors) when constructing the predictive tree.

In both schemes, attribute (de) coding is performed after complete geometry (de) coding, leading practically to a two-pass coding. Thus, the joint geometry/attribute low latency is obtained by using slices that decompose the 3D space into sub-volumes that are coded independently, without prediction between the sub-volumes. This may heavily impact the compression performance when many slices are used.

Combining together requirements on encoder and decoder simplicity, on low latency and on compression performance is still a problem that has not been satisfactory solved by existing point cloud codecs.

An important use case is the transmission of sparse geometry data sensed by at least one sensor mounted on a moving vehicle. This usually requires a simple and low latency embarked encoder. Simplicity is required because the encoder is likely to be deployed on computing units which perform other processing in parallel, such as (semi-) autonomous driving, thus limiting the processing power available to the point cloud encoder. Low latency is also required to allow for fast transmission from the car to a cloud in order to have a real-time view of the local traffic, based on multiple-vehicle acquisition, and take adequate fast decision based on the traffic information. While transmission latency can be low enough by using 5G, the encoder itself shall not introduce too much latency due to coding. Also, compression performance is extremely important since the flow of data from millions of cars to the cloud is expected to be extremely heavy.

Specific priors related to spinning Lidar-sensed sparse geometry data have been already exploited in G-PCC and have led to very significant gains of compression.

First, G-PCC exploits the elevation angle (relative to the horizontal ground) of sensing from a spinning Lidar head 10 as depicted on FIGS. 1 and 2. A Lidar head 10 comprises a set of sensors 11 (for example lasers), here five sensors are represented. The spinning Lidar head 10 may spin around a vertical axis z to sense geometry data of a physical object. Lidar-sensed geometry data is then represented in spherical coordinates $(r_{3D}, \phi, \theta)$, where $r_{3D}$ is the distance of a point P from the Lidar head's center, $\phi$ is an azimuthal angle of the Lidar head's spin relative to a referential, and $\theta$ is an elevation angle of a sensor k of the spinning Lidar head 10 relative to a horizontal referential plane.

A regular distribution along the azimuthal angle has been observed on Lidar-sensed data as depicted on FIG. 3. This regularity is used in G-PCC to obtain a quasi 1D representation of the point cloud where, up to noise, only a radius $r_{3D}$ belongs to a continuous range of values while the angles $\phi$ and $\theta$ take only a discrete number of values $\phi_i, \forall i=0$ to $I-1$ where I is a number of azimuthal angles used for the sensing of the points and $\theta_j \forall j=0$ to $N_{sensor}-1$ where $N_{sensor}$ is a number of sensors of the spinning Lidar head 10. Basically, G-PCC represents Lidar-sensed sparse geometry data on a two-dimensional (discrete) angular coordinate space $(\phi, \theta)$ as depicted on FIG. 3, together with a radius value $r_{3D}$ for each point.

This quasi 1D property has been exploited in G-PCC in both the occupancy tree and the predictive tree by predicting, in the spherical coordinate space, the location of a current point based on an already coded point by using the discrete nature of angles.

More precisely, the occupancy tree uses DCM intensively and entropy codes the direct locations of points within a node by using a context-adaptive entropy coder. Contexts are then obtained from the local conversion of the point locations into angular coordinates $(\phi, \theta)$ and from the location of these angular coordinates relative to discrete angular coordinates $(\phi_i, \theta_j)$ obtained from precedingly coded points. The predictive tree directly codes a first version of a point location in the angular coordinates $(r_{2D}, \phi, \theta)$, where $r_{2D}$ is the projected radius on the horizontal xy plane as depicted on FIG. 4, using the quasi 1D nature $(r_{2D}, \phi_i, \theta_j)$ of this angular coordinate space. Then, spherical coordinates $(r_{2D}, \phi, \theta)$ are converted into 3D cartesian coordinates (x,y,z) and a xyz residual is coded to tackle the errors of coordinate conversion, the approximation of elevation and azimuthal angles and potential noise.

G-PCC does use the angular priors to better compress spinning Lidar-sensed sparse geometry data but does not adapt the coding structure to the order of sensing. By its very nature, the occupancy tree must be coded down to its last depth before outputting a point. This occupancy data is coded in the so-called breadth-first order: the occupancy data of the root node is first coded, indicating its occupied child nodes; then the occupancy data for each of the occupied child nodes is coded, indicating the occupied grandchild nodes; and so on iteratively over the tree depth until leaf nodes can be determined and the corresponding points are provided/output to an application or to the attribute(s) coding scheme. Regarding the predictive tree, the encoder is free to choose the order of point in the tree, but to obtain good compression performance, to optimize the prediction accuracy, G-PCC proposes to code one tree per sensor. This has mainly the same drawback as using one coding slice per sensor, i.e. non-optimal compression performance because prediction between sensors is not allowed and does not provide encoder low latency. Worse, one should have one coding processing per sensor and the number of core coding units should equal the number of sensors; this is not practical.

In brief, in a framework of a spinning sensors head used for sensing sparse geometry data of a point cloud, prior arts do not solve the problem of combining encoding and decoding simplicity, low latency and compression performance.

Moreover, sensing sparse geometry data of point cloud by using spinning sensors head has some drawbacks and other types of sensor head may be used.

The mechanical parts generating the spin (rotation) of a spinning sensors head are prone to breakage and are costly. Also, by construction, the angle of view is necessarily $2\pi$. This does not allow to sense a particular region of interest with high frequency, for instance it may be more interesting to sense in front of a vehicle than behind. Practically in most cases, when a sensor is attached to a vehicle, most of the $2\pi$ angle of view is screened by the vehicle itself and the screened angle of view does not need to be sensed.

New types of sensors have emerged recently, allowing for a more flexible selection of the region to be sensed. In most recent designs, a sensor can be more freely and electronically (thus avoiding fragile mechanical parts) moved to obtain a large variety of sensing paths in the 3D scene as depicted on FIG. 5. On FIG. 5, a set of four sensors is shown. Their relative sensing directions, i.e. azimuthal and elevation angles, are fixed relative to each other, however they overall sense a scene following a programmable sensing path depicted by dashed lines on the two-dimensional angular coordinate $(\phi,\theta)$ space. Points of the point cloud may then be sensed regularly along the sensing path. Some sensor heads may also adapt their sensing frequency by increasing their sensing frequency when a region of interest R has been detected as illustrated on FIG. 6. Such a region of interest R may be associated with a close object, a moving object, or any object (pedestrian, other vehicle, etc.) precedingly segmented, for instance in a previous frame, or dynamically segmented during the sensing. FIG. 7 shows schematically another example of a sensing path (typical zigzag sensing path) used by a sensor head comprising two sensors able to increase their sensing frequencies when a region of interest has been detected (grey shaded points and grey hashed points). Using a zigzag sensing path may be advantageously used to sense a limited (azimuthal) angular sector of a 3D scene. Because sensors may be attached to a vehicle, their viewports of interest are necessarily limited by the presence of the vehicle itself that obstructs the scene, unless the sensors are located at the top of the car. Consequently, sensors with a limited probing angular sector are of high interest and easier to integrate to a vehicle.

As depicted on FIG. 8, a sensor head comprising a single sensor may also be used to sense multiple positions (two vertical positions on FIG. 8), for instance using reflections on mirrors oscillating with rotations (here vertical rotations). In that case, instead of using a set of sensors, a single sensor at different angular positions (i.e. with different elevation angle on FIG. 8) along a sensing path (here a zigzag sensing path) is used mimicking a sensing using a set of multiple sensors.

For the sake of simplicity, in the following descriptions and claims, the "sensor head" may refer to a set of physical sensors or a set of sensing elevation indexes mimicking a set of sensors as well. Also, one skilled in the art will understand that "a sensor" could also refer to a sensor in each sensing elevation index position.

Combining together requirements on encoder and decoder simplicity, on low latency and on compression performance of point cloud sensed by any type of sensors is still a problem that has not been satisfactory solved by existing point cloud codecs.

At least one embodiment of the present application has been devised with the foregoing in mind.

SUMMARY

According to a first aspect of the present application, there is provided a method of encoding, into a bitstream, point cloud geometry data represented by ordered coarse points occupying some discrete positions of a set of discrete positions of a two-dimensional space, said ordered coarse points being ordered according to a lexicographic order based on the coordinates of the two-dimensional space, wherein the method comprises encoding, into the bitstream, a data indicating if an occupied coarse point associated with a point of the point cloud is a late occupied coarse point, an occupied coarse point being considered as being a late occupied coarse point when its order index in the lexicographic order is lower than an order index of a first reference coarse point associated with a previously encoded point of the point cloud; if the data indicates that the occupied coarse point is a late occupied coarse point, then obtaining a late point order index difference between an order index of the late occupied coarse point, and an order index of a second reference coarse point; and encoding, into the bitstream, an amplitude of the late point order index difference.

According to a second aspect of the present application, there is provided a method of decoding, from a bitstream, point cloud geometry data represented by ordered coarse points occupying some discrete positions of a set of discrete positions of a two-dimensional space, said ordered coarse points being ordered according to a lexicographic order based on the coordinates of the two-dimensional space, wherein the method comprises decoding, from the bitstream, a data indicating if an occupied coarse point associated with a point of the point cloud is a late occupied coarse point, an occupied coarse point being considered as being a late occupied coarse point when its order in the lexicographic order is lower than an order of a first reference coarse point associated with a previously decoded point of the point cloud; and if the data indicates that the occupied coarse point is a late occupied coarse point, decoding, from the bitstream, an amplitude of a late point order index difference between an order index of the late occupied coarse point, and an order index of a second reference coarse point.

In some embodiments, said first reference coarse point may be a last encoded or decoded occupied coarse point or a previously encoded or decoded occupied coarse point with the highest order in the lexicographic order, and wherein said second reference coarse point is either the first reference coarse point or a coarse point associated with an order equals to the order of the first reference coarse point shifted by an offset.

According to a third aspect of the present application, there is provided a bitstream of encoded point cloud data representing point cloud geometry represented by ordered coarse points occupying some discrete positions of a set of discrete positions of a two-dimensional space, said ordered coarse points being ordered according to a lexicographic order based on the coordinates of the two-dimensional space, wherein the bitstream further comprises a data indicating if an occupied coarse point associated with a point of the point cloud is a late occupied coarse point, an occupied coarse point being considered as being a late occupied coarse point when its order in the lexicographic order is lower than an order of a reference coarse point associated with a previously encoded point of the point cloud.

BRIEF DESCRIPTION OF THE DRAWINGS

Reference will now be made, by way of example, to the accompanying drawings which show embodiments of the present application, and in which.

Similar reference numerals may have been used in different figures to denote similar components.

DETAILED DESCRIPTION

At least one of the embodiments is described more fully hereinafter with reference to the accompanying figures, in which examples of at least one of the embodiments are illustrated. An embodiment may, however, be embodied in many alternate forms and should not be construed as limited to the examples set forth herein. Accordingly, it should be understood that there is no intent to limit embodiments to the particular forms disclosed. On the contrary, the disclosure is intended to cover all modifications, equivalents, and alternatives falling within the spirit and scope of the present application.

At least one of the aspects generally relates to point cloud encoding and decoding, one other aspect generally relates to transmitting a bitstream generated or encoded and one other aspects relates to receiving/accessing a decoded bitstream.

Moreover, the present aspects are not limited to MPEG standards such as MPEG-I part 5 or part 9 that relate to the Point Cloud Compression, and may be applied, for example, to other standards and recommendations, whether pre-existing or future-developed, and extensions of any such standards and recommendations (including MPEG-I part 5 and part 9). Unless indicated otherwise, or technically precluded, the aspects described in the present application may be used individually or in combination.

The present invention relates to encoding/decoding point cloud geometry data represented by ordered coarse points of a coarse representation occupying some discrete positions of a set of discrete positions of a two-dimensional space.

For example, in the working group ISO/IEC JTC 1/SC 29/WG 7 on MPEG 3D Graphics Coding, a new codec named L3C2 (Low-Latency Low-Complexity Codec) is being considered to improve, relative to the G-PCC codec, the coding efficiency of Lidar-sensed point clouds. The codec L3C2 provides an example of a two-dimensional representation of the points of a point cloud namely a coarse representation. A description of the code can be found in the output document of the Working Group in N00167, ISO/IEC JTC 1/SC 29/WG 7, MPEG 3D Graphics Coding, "Technologies under Consideration in G-PCC", Aug. 31, 2021.

Basically, for each sensed point $P_n$ of the point cloud, a sensor index $\lambda_n$ associated with a sensor that sensed the point $P_n$ and an azimuthal angle on representing a sense angle of said sensor are obtained by converting 3D cartesian coordinates $(x_n,y_n,z_n)$ representing the 3D location of the sensed point $P_n$. Points of the point cloud are then ordered based on the azimuthal angles $\phi_n$ and the sensor indices $\lambda_n$, for example, according to a lexicographic order based first on the azimuthal angle and then on the sensor index. The order index $o(P_n)$ of a point $P_n$ is then obtained by:

$$o(P_n) = \phi_n^* K + \lambda_n \qquad (1)$$

where K is the number of sensors.

Figure 1:
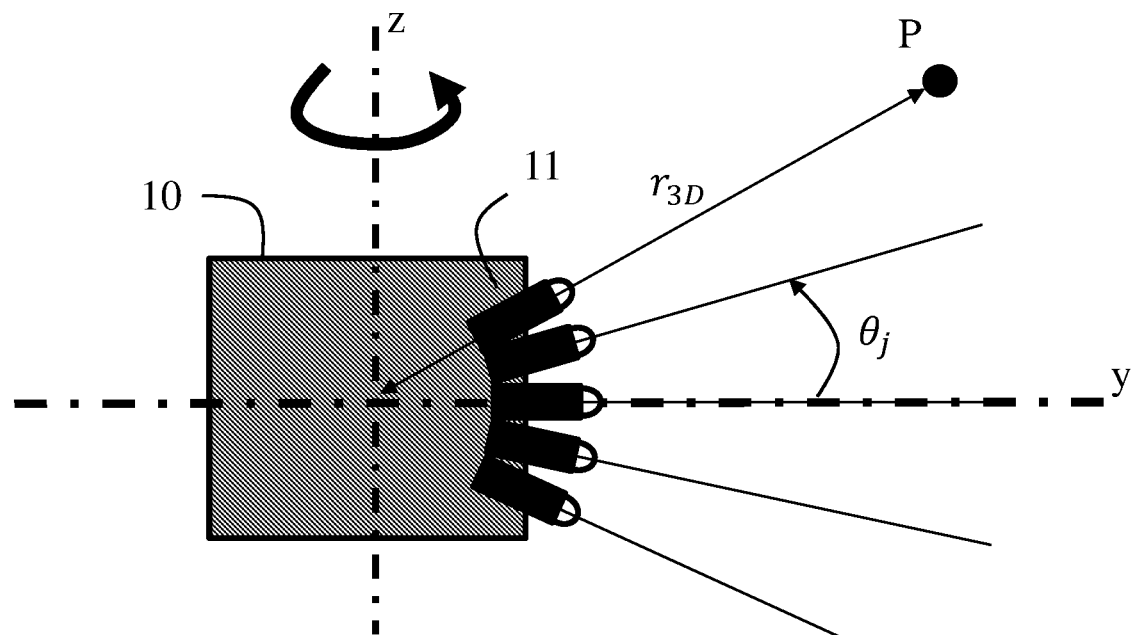
FIG. 1 shows schematically a side view of a sensor head and some of its parameters in accordance with prior art.
Figure 2:
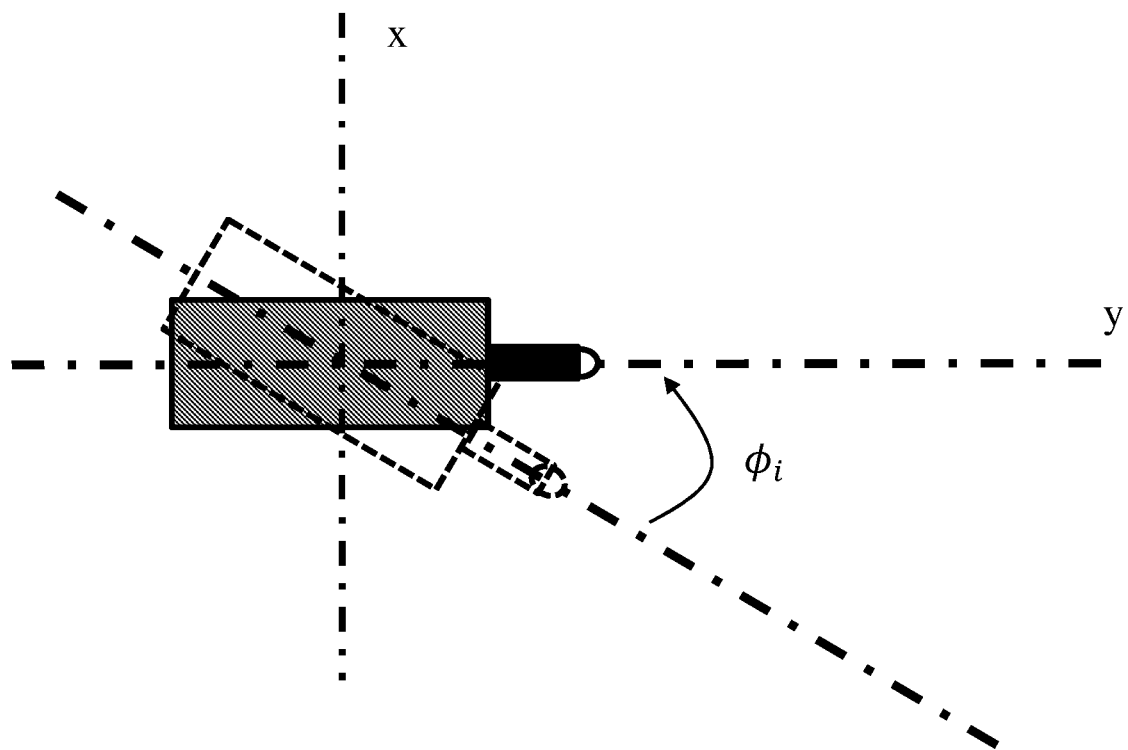
FIG. 2 shows schematically a top view of the sensor head and some of its parameters in accordance with prior art.
Figure 3:
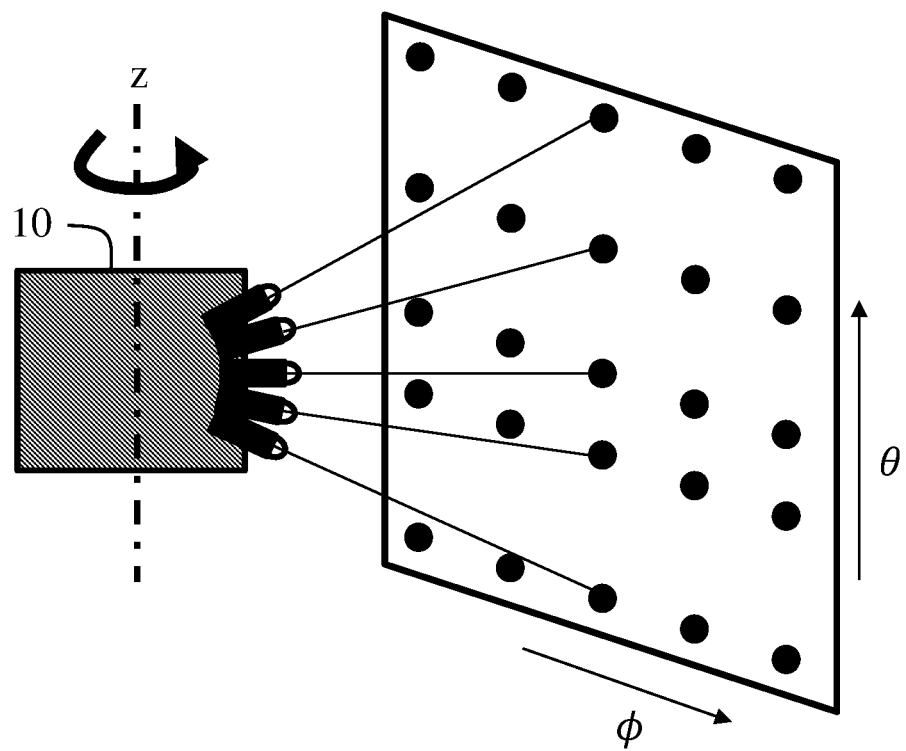
FIG. 3 shows schematically a regular distribution of data sensed by a spinning sensor head in accordance with prior art.
Figure 4:
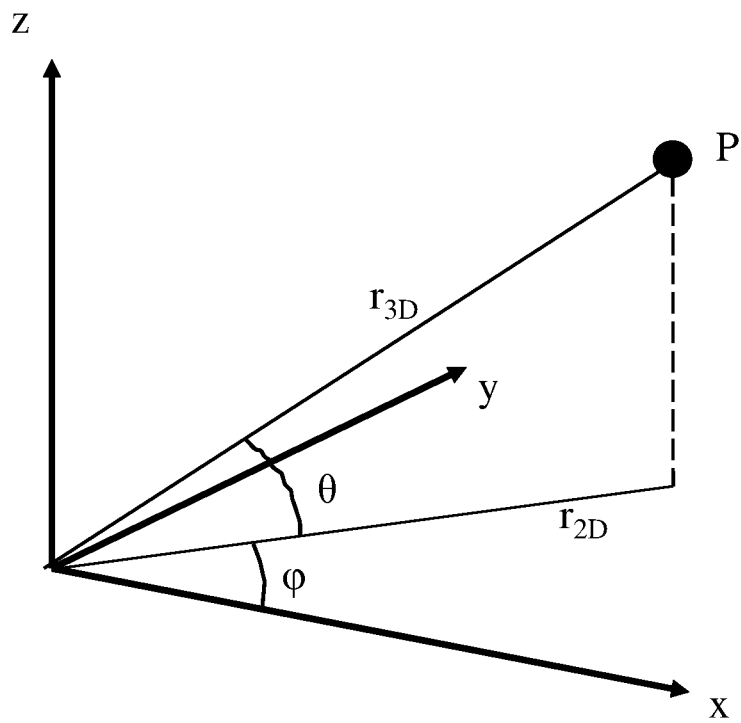
FIG. 4 shows schematically a representation of a point of a point cloud in a 3D space in accordance with prior art.
Figure 5:
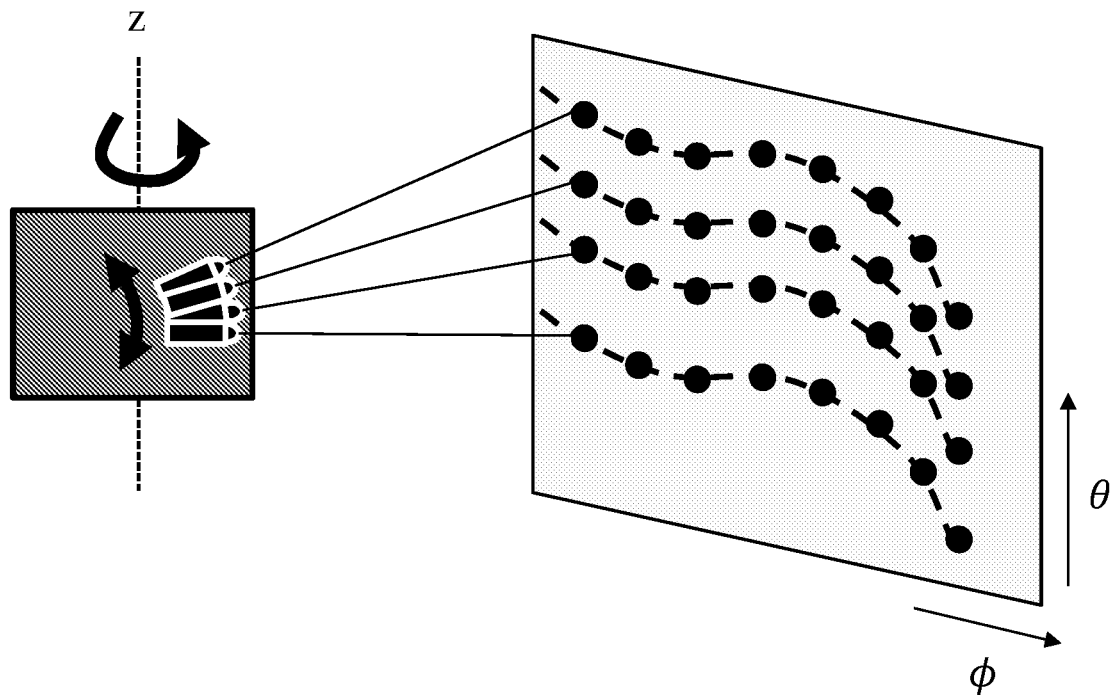
FIG. 5 shows schematically an example of a sensor head able to sense a real scene following a programmable sensing path in accordance with prior art.
Figure 6:
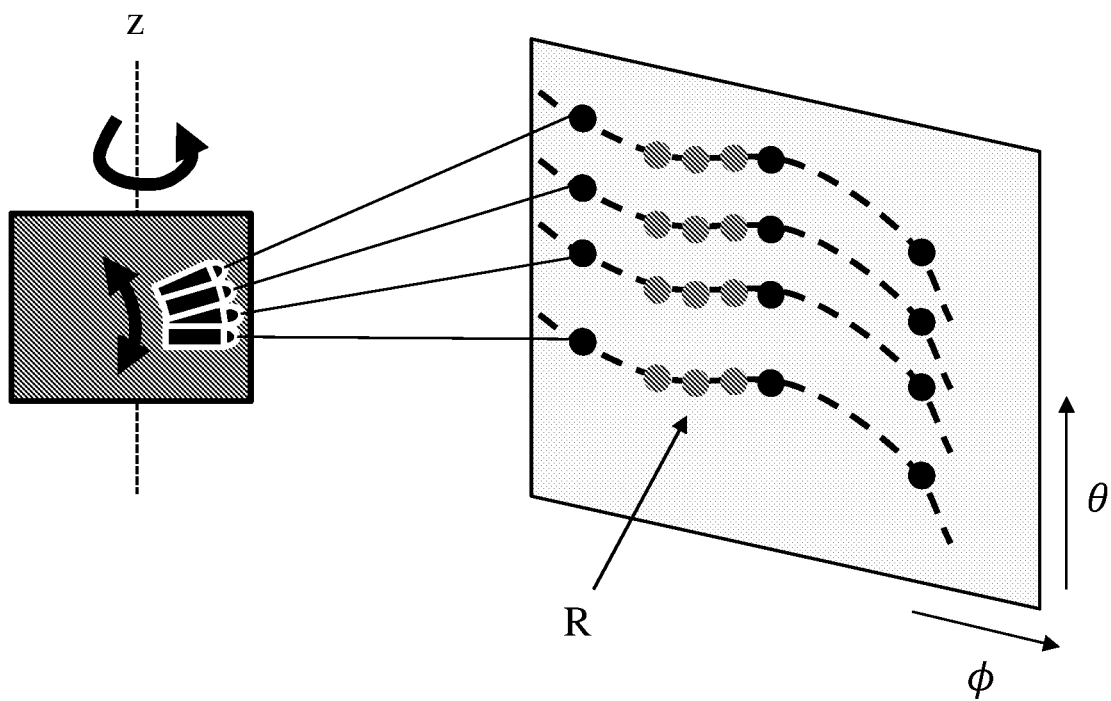
FIG. 6 shows schematically an example of a sensor head able to sense a real scene following a programmable sensing path according to different sensing frequencies in accordance with prior art.
Figure 7:
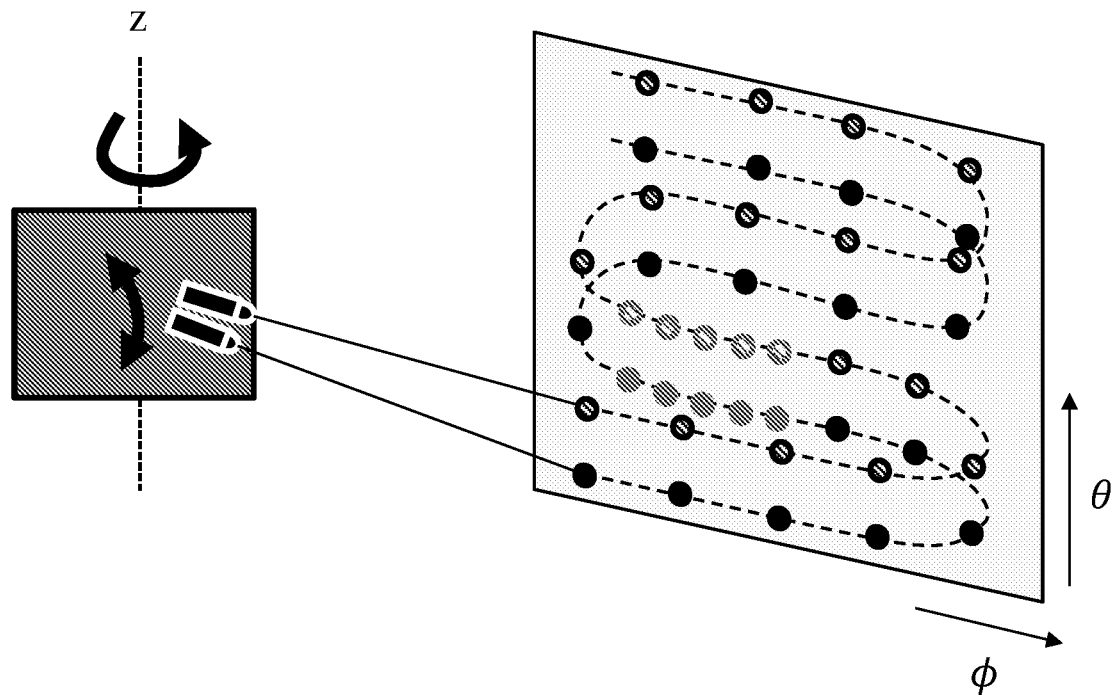
FIG. 7 shows schematically an example of a sensor head able to sense a real scene following a programmable zigzag sensing path according to different sensing frequencies in accordance with prior art.
Figure 8:
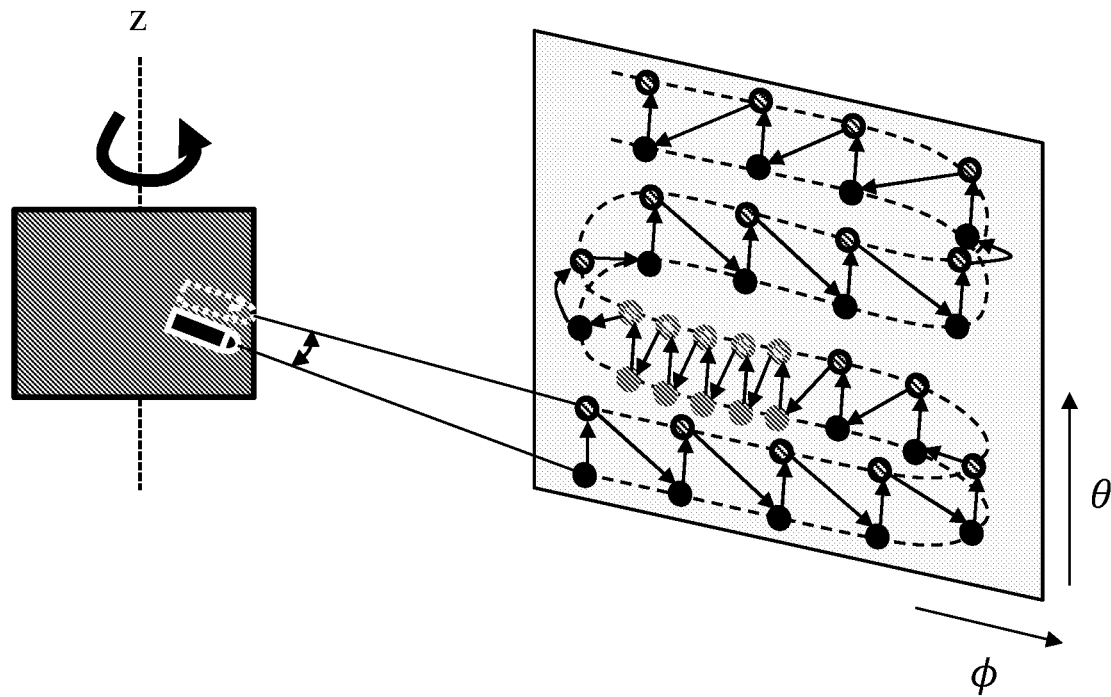
FIG. 8 shows schematically a single sensor head able to sense a real scene following a programmable zigzag sensing path according to different sensing frequencies.
Figure 9:
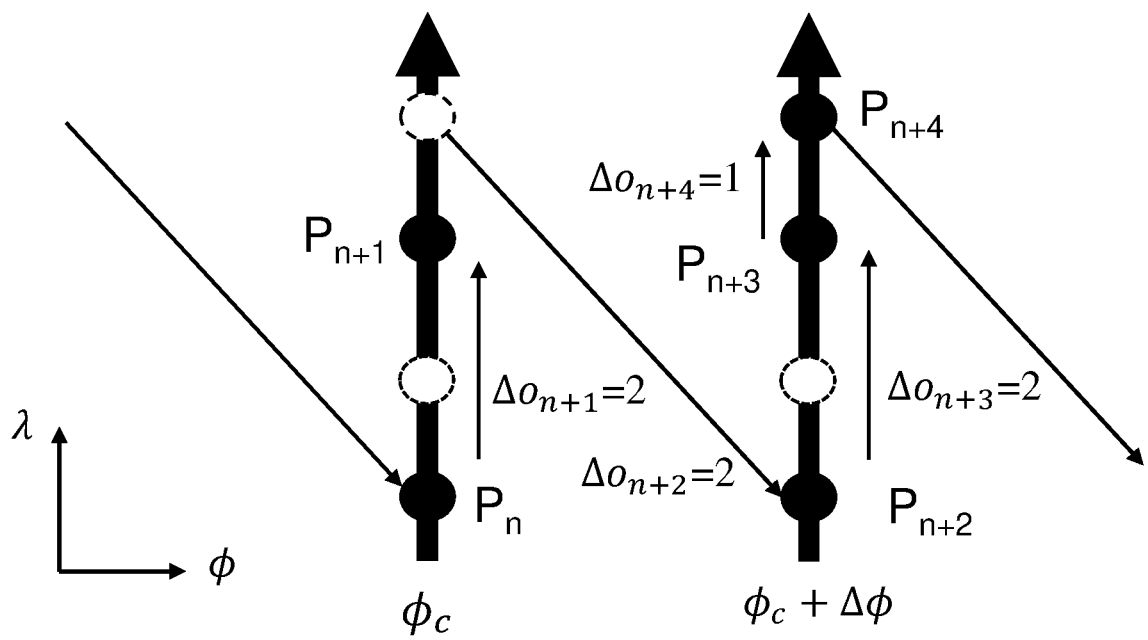
FIG. 9 shows schematically an example of ordered coarse points of a coarse representation in accordance with at least one embodiment.

FIG. 9 shows schematically ordered coarse points of a coarse representation. Five points of the point cloud have been sensed. Each of these five points are coarsely represented by a coarse point (black point) in the coarse representation: two coarse points $P_n$ and $P_{n+1}$ represent two points of the point cloud sensed at time $t_1$ with an angular angle $\phi_c$ (among the $\phi_i$'s) and three coarse points represent three points of the point cloud sensed at time $t_2$ with an angular angle $\phi_c+\Delta\phi$. A coarse point that represents a sensed point of the point cloud is namely an occupied coarse point and coarse point that do not represent a sensed point of the point cloud is namely an unoccupied coarse point. Because the points of the point cloud are represented by occupied coarse points in the coarse representation, the order indices associated with the points of the point cloud are also the order indices associated with the occupied coarse points.

The coarse representation of the point cloud geometry data may then be defined in a two-dimensional coordinate $(\phi, \lambda)$ space.

The coarse representation may also be defined for any types of sensors head including rotating (spinning) or non-rotating sensors heads. Its definition is based on a sensing path defined from sensor characteristics in a two-dimensional angular coordinate ($\phi$, $\theta$) space comprising an azimuthal coordinate $\phi$ representative of an azimuthal angle representing a sensing angle of a sensor relative to a referential and an elevation coordinate e representative of an elevation angle of a sensor relative to a horizontal referential plane. The sensing path is used to sense the points of the point cloud according to ordered coarse points representing potential locations of sensed points of the point cloud. Each coarse point is defined from one sample index s associated with a sensing time instant along the sensing path and one sensor index $\lambda$ associated with a sensor.

Figure 10:
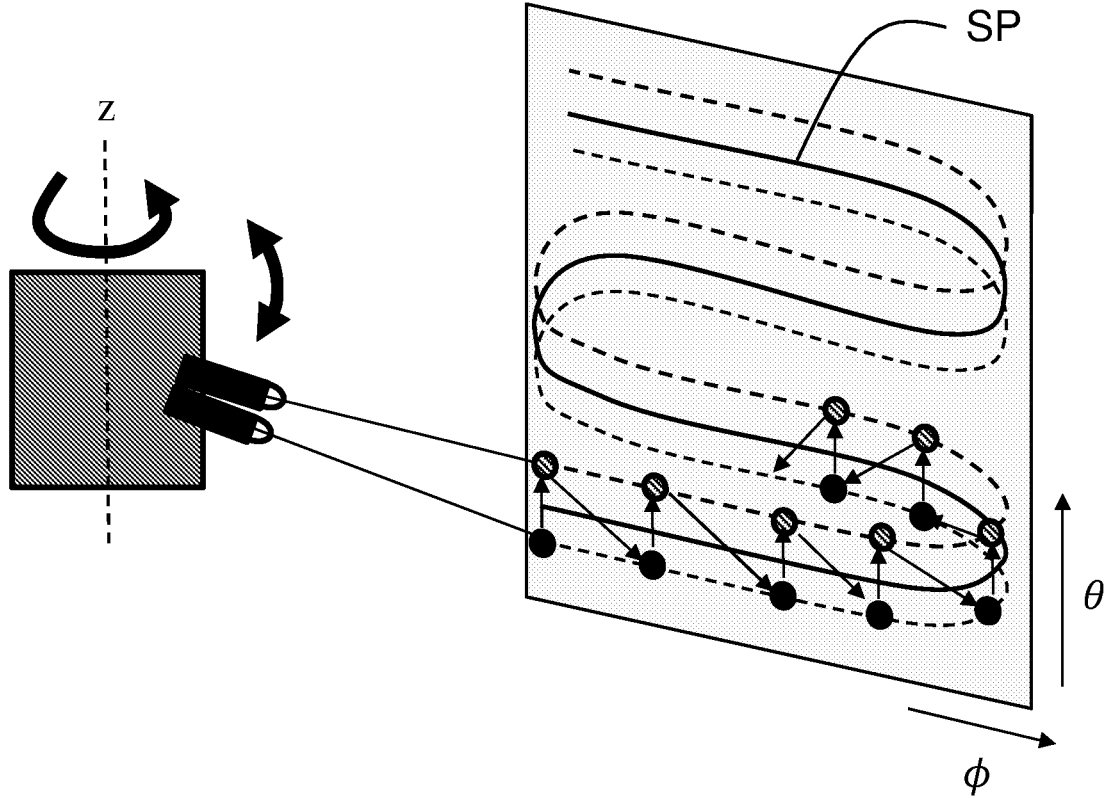
FIG. 10 shows schematically an example of ordered coarse points of a coarse representation sensed by a two-sensors head in accordance with at least one embodiment.
Figure 11:
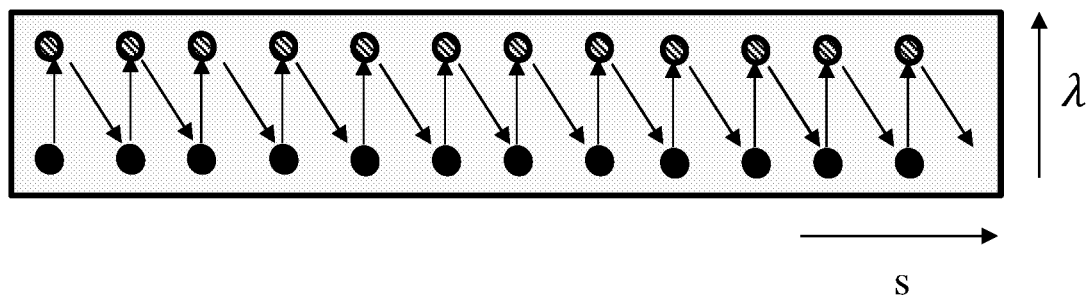
FIG. 11 shows schematically a representation of ordered coarse points in the two-dimensional coordinate $(s,\lambda)$ space in accordance with at least one embodiment.

On FIG. 10, a sensor head comprising two sensors is used. The sensing paths followed by the two sensors are represented in dash lines. For each sample index s (each sensing time instant), two coarse points are defined. The coarse points associated with the first sensor are represented by black shaded points on FIG. 10 and the coarse points associated with the second sensor are represented by a black hashed point. Each of these two coarse points belongs to a sensor sensing path (dash line) defined from the sensing path SP. FIG. 11 shows schematically a representation of ordered coarse points in the two-dimensional coordinate (s,$\lambda$) space. Arrows on FIGS. 10 and 11 illustrate the links between two successive ordered coarse points.

An order index o(P) is associated with each coarse point according to the rank of said coarse point among the ordered coarse points:

$$o(P) = \lambda + s^*K \quad (2)$$

where K is the number of sensors of a set of sensors or the number of different positions of a single sensor for a same sample index, $\lambda$ is the sensor index of the sensor that sensed the point P of the point cloud at the sensing time instant s.

Figure 12:
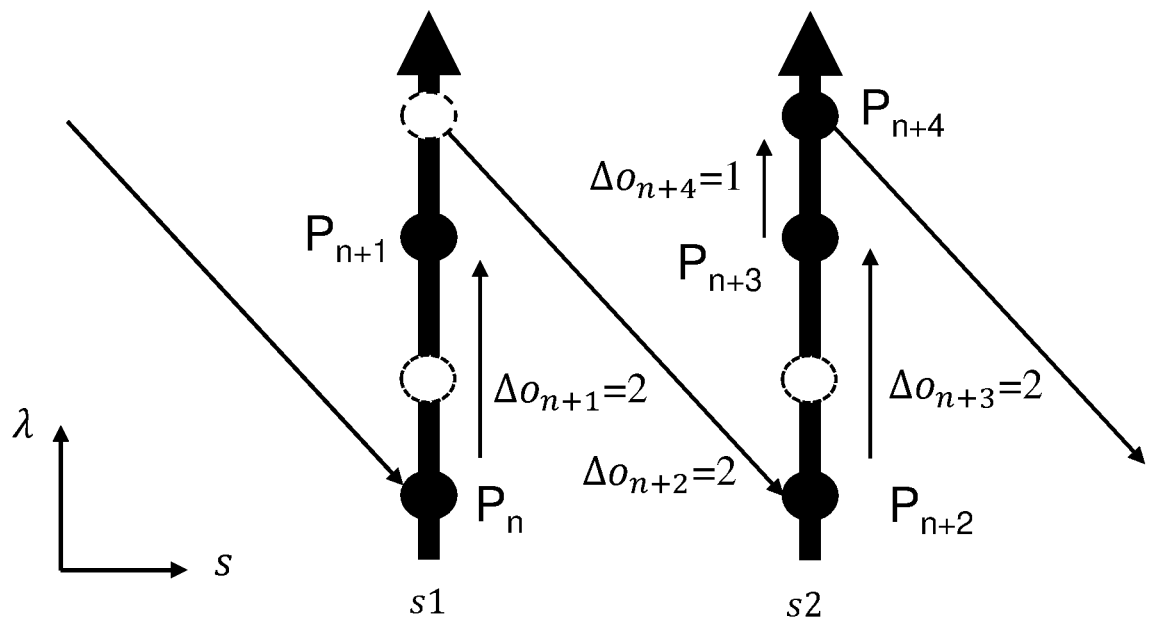
FIG. 12 shows schematically ordered coarse points of a coarse representation in accordance with at least one embodiment.

FIG. 12 illustrates ordered coarse points of a coarse representation, five occupied coarse points are represented (black circles): two coarse points $P_n$ and $P_{n+1}$ are occupied by two points of the point cloud sensed at a sensing time instant $t_1$ (corresponding to a sample index $s_1$) and three coarse points are occupied by three points of the point cloud sensed at a sensing time instant $t_2$ (corresponding to a sample index $s_2$).

The coarse representation of the point cloud geometry data may then be defined in a two-dimensional coordinate (s, $\lambda$) space.

Independently of the two-dimensional space in which a coarse representation of point cloud geometry data is defined, encoding point cloud geometry data comprises encoding the occupancy data of occupied coarse points of the coarse representation by encoding order index differences $\Delta o$ representing, each, a difference between order indices of two consecutive occupied coarse points $P_{-1}$ and P:

$$\Delta o = o(P) - o(P_{-1}) \quad (3)$$

On FIG. 9, assuming the coordinates of a first occupied coarse point $P_n$ in the two-dimensional coordinate ($\phi$, $\lambda$) space are known beforehand, a first order index difference $\Delta o_{n+1}$ is obtained as a difference between the order index $o(P_{n+1})$ associated with the occupied coarse point $P_{n+1}$ and the order index $o(P_n)$ associated with the occupied coarse point $P_n$. A second order index difference $\Delta o_{n+2}$ is obtained as a difference between the order index $o(P_{n+2})$ associated with another occupied coarse point $P_{n+2}$ and the order index $o(P_{n+1})$ associated with $P_{n+1}$, and so on.

On FIG. 12, assuming the coordinates of the first occupied coarse point $P_n$ in the two-dimensional coordinate (s, $\lambda$) space are known beforehand, a first order index difference $\Delta o_{n+1}$ is obtained as a difference between the order index $o(P_{n+1})$ of the occupied coarse point $P_{n+1}$ and the order index $o(P_n)$ of the occupied coarse point $P_n$. In the example $\Delta o_{n+1}=2$ because a coarse point is not occupied (white circle). A second order index difference $\Delta o_{n+2}$ is obtained as a difference between the order index $o(P_{n+2})$ of another occupied coarse point $P_{n+2}$ and the order index $o(P_{n+1})$ of the occupied coarse point $P_{n+1}$, and so on.

The order index $o(P_1)$ of the first coarse point occupied by the first sensed point $P_1$ of the point cloud may be directly encoded into the bitstream B. This is equivalent to arbitrary setting the order index of a virtual zero-th point to zero, i.e. $o(P_0)=0$, and coding $\Delta o_1=0$ $(P_1)-o(P_0)=o(P_1)$.

Given the order index $o(P_1)$ of the first coarse point occupied by the first sensed point $P_1$ of the point cloud, and order differences $\Delta o$, one can recursively reconstruct the order index o(P) of any occupied coarse point occupied by a sensed point P of the point cloud by:

$$o(P) = o(P_{-1}) + \Delta o$$

In the following, the invention is mainly described by considering a coarse representation defined in the two-dimensional coordinate (s,$\lambda$) space. But the same may also described for a coarse representation defined in the two-dimensional coordinate ($\phi$, $\lambda$) space because a spinning sensor-head such a Lidar-head is a particular coarse representation defined in the two-dimensional coordinate (s,$\lambda$) space in which at each sensing time instant, sensors of the sensors head probe an object and the sensed points correspond to occupied coarse point of the representation.

In practice, the order index differences $\Delta o$ are usually positive values because the sensing order of the points of the point cloud is equal to the lexicographic order of the associated occupied coarse points within the coarse representation.

However, it may happen that some point of the point cloud sensed according to a sensing order does not exactly follows the lexicographic order of the occupied coarse points associated with those sensed points. Those points are called late occupied coarse points.

For instance, when the coarse representation is defined in the two-dimensional coordinate ($\phi$, $\lambda$) space, an azimuthal angle $\phi_c$, of an occupied coarse point within the coarse representation defined by the two-dimensional coordinate ($\phi$, $\lambda$), is obtained by $$\phi_c = \text{round}\left(\frac{\phi}{\Delta\phi}\right)$$

where $\phi$ is the azimuthal angle associated with the sensed point of the point cloud associated with an occupied coarse point and $\Delta\phi$ is an azimuthal shift. Because of the rounding of the ratio of the real azimuthal angle $\phi$ over the azimuthal shift Δφ, the azimuthal angle φ_c may be 1 (or more) below an expected value in the coarse representation according to the lexicographic order if the value of φ includes an additive noise equal to −Δφ/2 or less; or it may be 1 (or more) above if the additive noise is equal to Δφ/2 or more.

In a coarse representation defined in the two-dimensional coordinate (s,λ) space, sensed points of the point cloud according to a sensing order may also not exactly follow the lexicographic order of the occupied coarse points associated with those sensed points because noise on the sensed points may lead to a series of sensed points having a non-increasing series of sample index coordinate s.

The lexicographic order used for ordering coarse points within the coarse representation, may also be ill-adapted to practical systems where the sensor head sends data to one or more operating parts (such as an encoder and/or an embedded data analyzers for instance) over a transmission bus or channel that is prone to transmission errors (due to transmission collisions or electromagnetic perturbations for instance). In such systems, when a transmission error is detected, sensor data sent by a sensor head is usually resent. But in the meantime, other sensor data may have been already transmitted before resending previously said sensor data.

For these two practical use cases, the order of sensed points of the point cloud received as input of an encoder may not always be the expected lexicographic order.

To tackle the problem of late occupied coarse points, sensed points received by an encoder may be buffered. Buffering sensed points allows reordering those points to fix the differences between the sensing order (or reception order) and the lexicographic order. Buffering sensed points is not always an acceptable solution because the buffer size may need to become big (beyond practical implementations) to support the correction of maximum possible differences between the sensing order and the lexicographic order especially when the level of disturbance (noise and/or retransmissions latency) is high.

Also, if the buffered sensed points are sent too early to the encoder while new points that should have been encoded beforehand do arrive later, there is no real solution: the sensed points have to be dropped (i.e. the late occupied coarse points are lost), because they cannot be encoded anymore.

Estimating a maximum buffer size beforehand is quite impossible because it depends on maximum differences between the sensing order and the lexicographic order that depends on used systems. This is especially true with a system prone to transmission errors, where, in a worst-case scenario, it may be needed to retransmit some sensed points more than once before succeeding, and so some sensed points could be lost if they arrive to late or if the buffer size is exceeded. To overcome this issue, the maximum buffer size may be over-estimated, but it leads to waste or resources.

Moreover, one of the requirements is to design an encoding/decoding of point cloud geometry data with extremely low latency. This is not compatible with a solution that would embed reordering of sensed points based on buffering because inacceptable delay before the encoding would be then introduced.

One of the problems to be solved is to handle the encoding/decoding of late occupied coarse points associated with sensed points of a point cloud relatively to a lexicographic order of occupied coarse points defined in a coarse representation, while preserving the low latency coding of the points of the point cloud and without significantly degrading the coding performance obtained in the ideal use case when all the sensed points are correctly ordered.

The locations of occupied coarse points associated with sensed points are represented as discrete positions of a grid in a two-dimensional space. The grid comprises rows and columns and each occupied coarse point belongs to an intersection of a column and a row of said grid. There is one row for each sensor index λ and one column for each sample index s. In the case where s is associated to an angle, a straightforward solution to the above problem would consist in adding many empty columns from a current occupied coarse point to recover a late occupied coarse point by inserting a "fake" empty turn (i.e. recovering an angle for a nearly complete rotation, up to the angle associated with the late occupied coarse point). It would work in the sense that points and late occupied coarse points could be encoded/decoded. However, the cost of encoding/decoding empty columns would jeopardize the compression efficiency of the encoding/decoding.

In brief, the present invention provides a method of encoding, into a bitstream, point cloud geometry data represented by ordered coarse points occupying some discrete positions of a set of discrete positions of a two-dimensional space. The ordered coarse points are ordered according to a lexicographic order based on the coordinates of the two-dimensional space.

The point cloud geometry is encoded into a bitstream by encoding occupied coarse points representing said points of the point cloud in the coarse representation defined by the two-dimensional space. Each next occupied coarse point $P_{next}$, associated with a point of the point cloud, is encoded one after each other, by considering a first reference coarse point $P_{ref}$, associated with a previously encoded point of the point cloud. Orders $o(P_{next})$ and $o(P_{ref})$ are determined by equation (1 or 2), i.e. according to a lexicographic order.

An order index difference Δo is obtained by:

$$\Delta o = o(P_{next}) - o(P_{ref}). \qquad (4)$$

When the order $o(P_{next})$ is greater than an order $o(P_{ref})$, the next occupied coarse point $P_{next}$ is considered as not being a late occupied coarse point and the order index difference Δo is positive.

When the order $o(P_{next})$ is lower than the order $o(P_{ref})$, then the next occupied coarse point $P_{next}$ is considered as being a late occupied coarse point and the order index difference Δo is negative.

A data $S_{next}$ indicating if a next occupied coarse point $P_{next}$ is or not a late occupied coarse point is encoded into the bitstream.

Encoding a data $S_{next}$ indicating if a next occupied coarse point $P_{next}$ is or not a late occupied coarse point is equivalent to encoding the sign of the order index difference Δo.

If the data $S_{next}$ indicates that the sign of the order index difference Δo is positive, the order index difference Δo is encoded into the bitstream.

If the data $S_{next}$ indicates that the occupied coarse point is a late occupied coarse point $P_{next}$, a late point order index difference $\Delta o_{late}$ between the order index $o(P_{next})$ and an order index of a second reference coarse point $P'_{ref}$ is obtained, and the amplitude of the order index difference is encoded into the bitstream.

The method provides thus a very simple solution to the problem of encoding/decoding late occupied coarse points while preserving the low latency coding of the points of the point cloud.

Moreover, as discussed below, encoding the data $S_{next}$ does not significantly degrade the coding performance obtained in the ideal use case when all the sensed points are correctly ordered.

Figure 13:
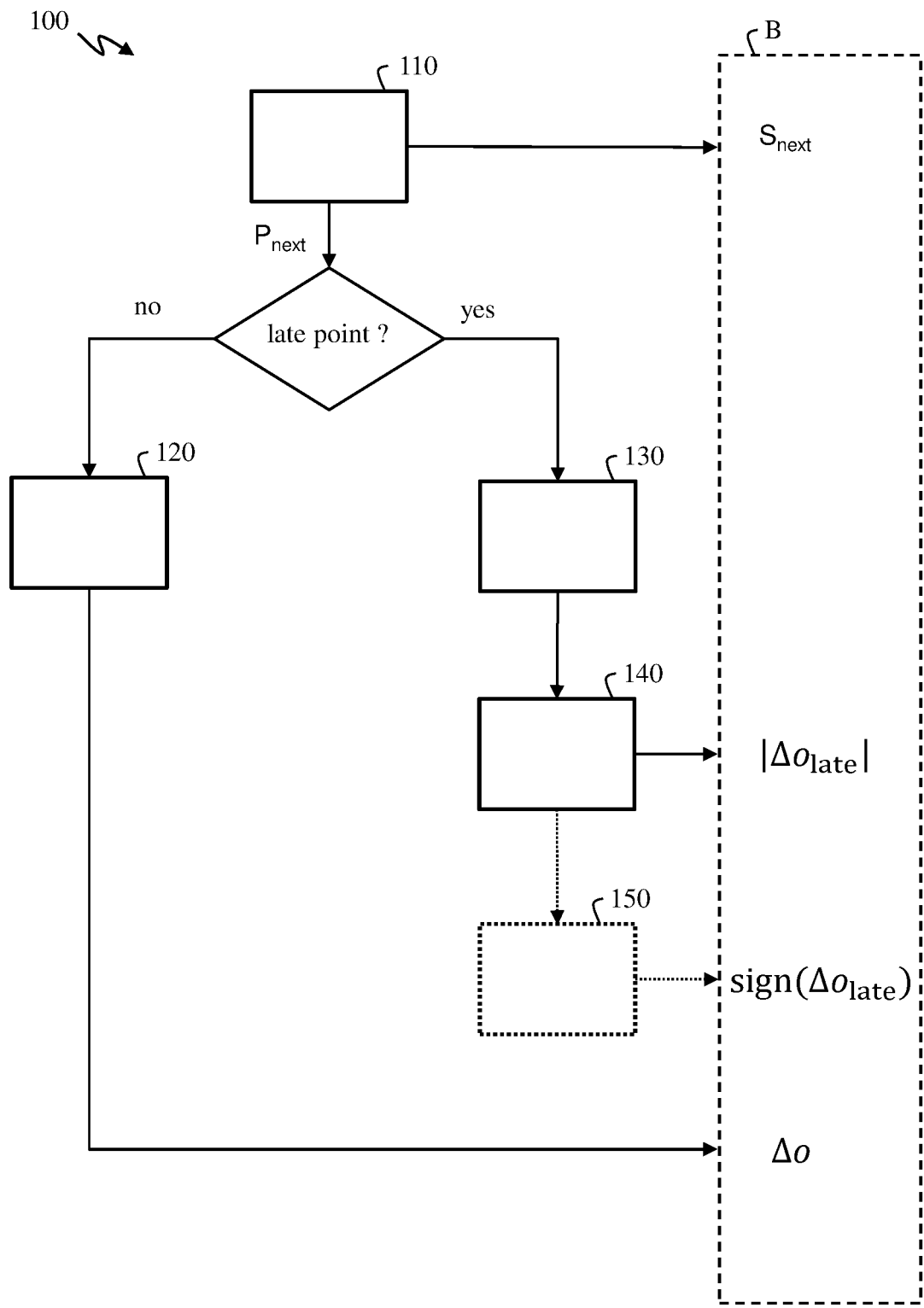
FIG. 13 shows a schematic block diagram of steps of a method 100 of encoding point cloud geometry data into a bitstream of encoded point cloud data in accordance with at least one embodiment.

FIG. 13 shows a schematic block diagram of steps of a method 100 of encoding point cloud geometry data into a bitstream of encoded point cloud data in accordance with at least one embodiment.

In step 110, an order index difference $\Delta o$ is calculated using equation (4), and a data $S_{next}$ is obtained based on the order index difference $\Delta o$ and encoded into a bitstream B. The data $S_{next}$ may indicate if the order index difference $\Delta o$ is negative and so, if an occupied coarse point $P_{next}$ associated with a point of the point cloud is a late occupied coarse point.

If the data $S_{next}$ indicates that the occupied coarse point $P_{next}$ is not a late occupied coarse point, in step 120, the positive order index difference $\Delta o$ is encoded into the bitstream B.

For example, the positive order index difference $\Delta o$ may be binarized as a series of binary data and each binary data of the series is entropy encoded into the bitstream B.

If the data $S_{next}$ indicates that the occupied coarse point $P_{next}$ is a late occupied coarse point, then in step 130, a late point order index difference $\Delta o_{late}$ is obtained between the order index $o(P_{next})$, and an order index $o(P'_{ref})$ of a second reference coarse point $P'_{ref}$. Next, in step 140, the amplitude $|\Delta o_{late}|$ of the late point order index difference $\Delta o_{late}$ is encoded into the bitstream B.

Optionally, if the amplitude $|\Delta o_{late}|$ is not null, in step 150, the sign of the late point order index difference $\Delta o_{late}$ is encoded into the bitstream B.

Figure 14:
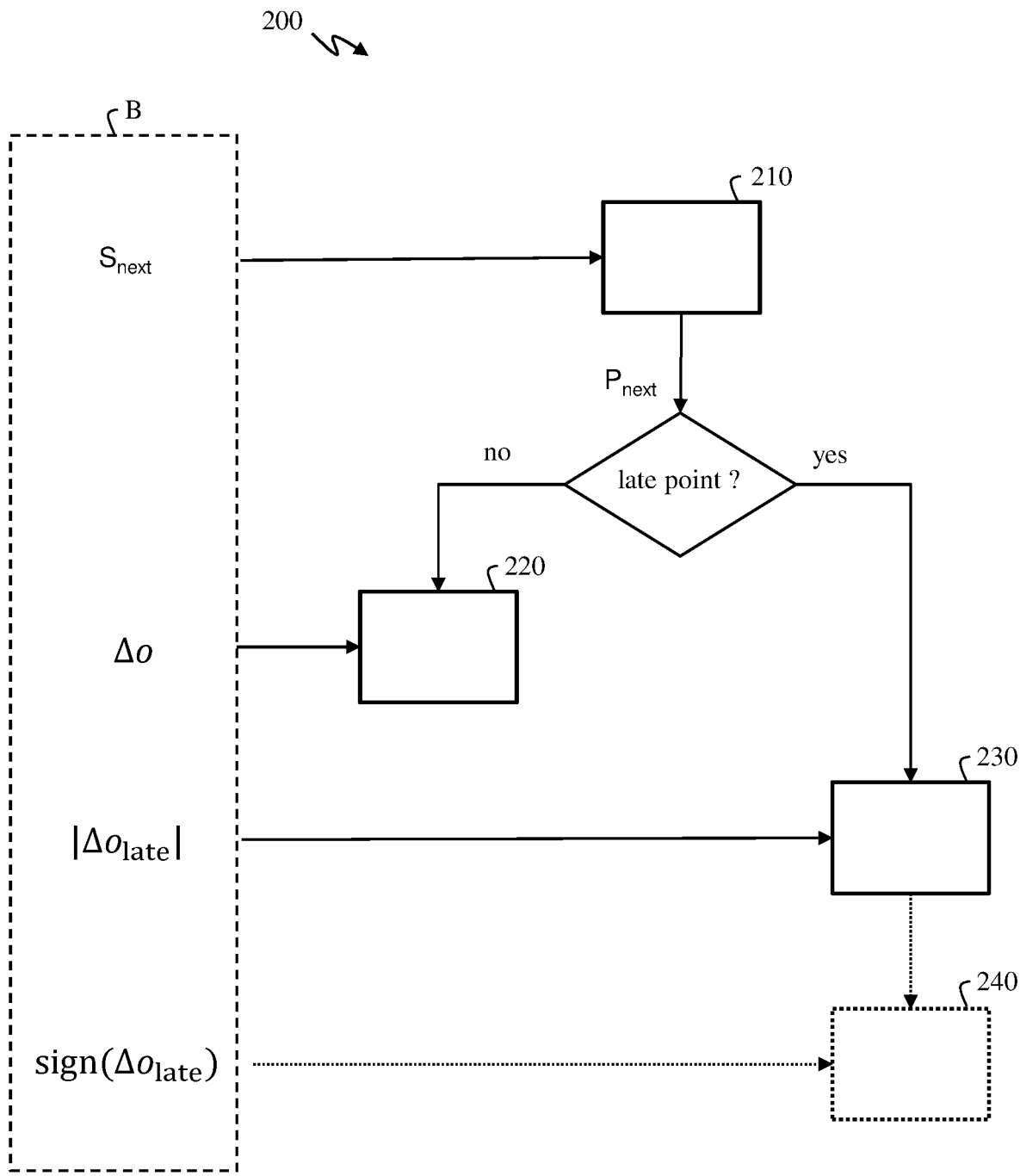
FIG. 14 shows a schematic block diagram of steps of a method 200 of decoding point cloud geometry data from a bitstream of encoded point cloud data in accordance with at least one embodiment.

FIG. 14 shows a schematic block diagram of steps of a method 200 of decoding point cloud geometry data from a bitstream of encoded point cloud data in accordance with at least one embodiment.

The decoding method 200 is straightforwardly deduced from the encoding method 100.

In step 210, a data $S_{next}$ is decoded from the bitstream B. The data $S_{next}$ indicates if an occupied coarse point $P_{next}$ associated with a point of the point cloud to be decoded is a late occupied coarse point. An occupied coarse point being considered as being a late occupied coarse point $P_{next}$ when its order in the lexicographic order is lower than an order of a first reference coarse point $P_{ref}$ associated with a previously decoded point of the point cloud.

If the data $S_{next}$ indicates that the occupied coarse point $P_{next}$ is not a late occupied coarse point, in step 220, a positive order index difference $\Delta o$ is decoded from the bitstream B. The positive order index difference $\Delta o$ represents a difference between the order index $o(P_{next})$ of the occupied coarse point $P_{next}$ and the order index $o(P_{ref})$ of the reference coarse point $P_{ref}$.

In one embodiment of step 220, a series of binary data may be entropy decoded from the bitstream B and the positive order index difference $\Delta o$ may be obtained from the series of decoded binary data.

If the data $S_{next}$ indicates that the occupied coarse point $P_{next}$ is a late occupied coarse point, then in step 230, an amplitude $|\Delta o_{late}|$ of a late point order index difference $\Delta o_{late}$ is decoded from the bitstream B.

The late point order index difference $\Delta o_{late}$ is a difference between the order index $o(P_{next})$ and an order index of a second reference coarse point $P'_{ref}$.

Optionally, in step 240, if the amplitude $|\Delta o_{late}|$ is not null, the sign of the late point order index difference $\Delta o_{late}$ may be decoded from the bitstream B.

In one embodiment of step 150 (240), the sign of the late point order index difference $\Delta o_{late}$ may be bypass coded (i.e. it is coded directly as a bit without entropy coding).

In one embodiment, the first reference coarse point $P_{ref}$ may be the last encoded or decoded occupied coarse point Plast, which is associated with the last encoded or decoded point of the point cloud, in coding or decoding order. Equation (4) becomes equation (5) given by:

$$\Delta o = o(P_{next}) - o(P_{last}). \qquad (5)$$

It may occur that the last encoded (decoded) occupied coarse point Plast is not the preceding encoded (decoded) occupied coarse point having the highest order in the lexicographic order when late occupied coarse points occur.

In one embodiment, the first reference coarse point $P_{ref}$ may be the previously encoded or decoded occupied coarse point $P_{high}$ having the highest order index in the lexicographic order. Equation (4) becomes equation (6) given by:

$$\Delta o = o(P_{next}) - o(P_{high}). \qquad (6)$$

In one embodiment, the second reference coarse point $P'_{ref}$ may be the first reference coarse point $P_{ref}$ i.e. is either the last encoded or decoded occupied coarse point Plast, or the previously encoded or decoded occupied coarse point $P_{high}$.

According to this embodiment, the late point order index difference $\Delta o_{late}$ is equal to the order index $\Delta o$ as computed in equation (4). The late point order index difference $\Delta o_{late}$ is then a negative order index difference and it may not be positive, nor null. Then the steps 150 and 240 are omitted and the sign may be inferred such as the late point order index difference $\Delta o_{late}$ is negative.

The embodiment, in which the second reference coarse point $P'_{ref}$ is the last encoded or decoded occupied coarse point Plast, is especially adapted when there is a small noise on the coordinate o or s of the two-dimensional space as it may reduce the cost for encoding (decoding) the amplitude of the late point order index difference.

In one embodiment, the second reference coarse point $P'_{ref}$ may be an occupied or unoccupied coarse point associated with an order index equals to the order index of the first reference coarse point $P_{ref}$ shifted by an offset.

In one variant, the offset may be calculated from all or a subset of negative order index differences $\Delta o$ obtained from previously encoded or decoded points, and of the order index $o(P_{ref})$ of the first reference coarse point $P_{ref}$.

For example, the offset equals to an average of $2^N$ negative order index differences $\Delta o$, with N equal to 3 or 4, for instance the $2^N$ last encoded or decoded negative order index differences $\Delta o$.

In one variant, the amplitude $|\Delta o_{late}|$ of the late point order index difference $\Delta o_{late}$ minus 1 may be encoded into (decoded from) the bitstream B.

In one embodiment of the methods 100 and 200, the data $S_{next}$ may be a syntax element denoted 'next_point_is_late_flag' for example. The data $S_{next}$ may be thus a binary data (flag).

In a variant, a binary data (flag) may be signaled, for instance in a geometry parameter set, to indicate that the data $S_{next}$ doesn't not need to be encoded and that it can always be inferred as indicating that the next occupied coarse point $P_{next}$ is not late. Thus, if the point cloud is guaranteed to be in the ideal use case, there is no coding penalty at all. This binary data informs if the lexicographic order indices will always be increasing during the decoding, which may be useful for a decoding application, to use an optimized decoding or rendering pipeline for instance, when it is in the ideal use case.

In one embodiment of step 110 (210), the data $S_{next}$ may be a binary data indicating if an occupied coarse point ($P_{next}$) associated with a point of the point cloud is a late occupied coarse point, and it may be entropy encoded (decoded) based on at least one other binary data $S_{next,i}$. Each of said at least one binary data $S_{next,i}$ indicates if a precedingly encoded (decoded) occupied coarse point $P_i$, associated with a precedingly encoded (decoded) point of the point cloud, is a late occupied coarse point.

Entropy encoding (decoding) the binary data $S_{next}$ based on said at least one other binary data $S_{next,i}$ provides more efficient encoding (decoding) of the binary data $S_{next}$ compared to encoding (decoding) each binary data $S_{next}$ independently to each other.

Figure 15:
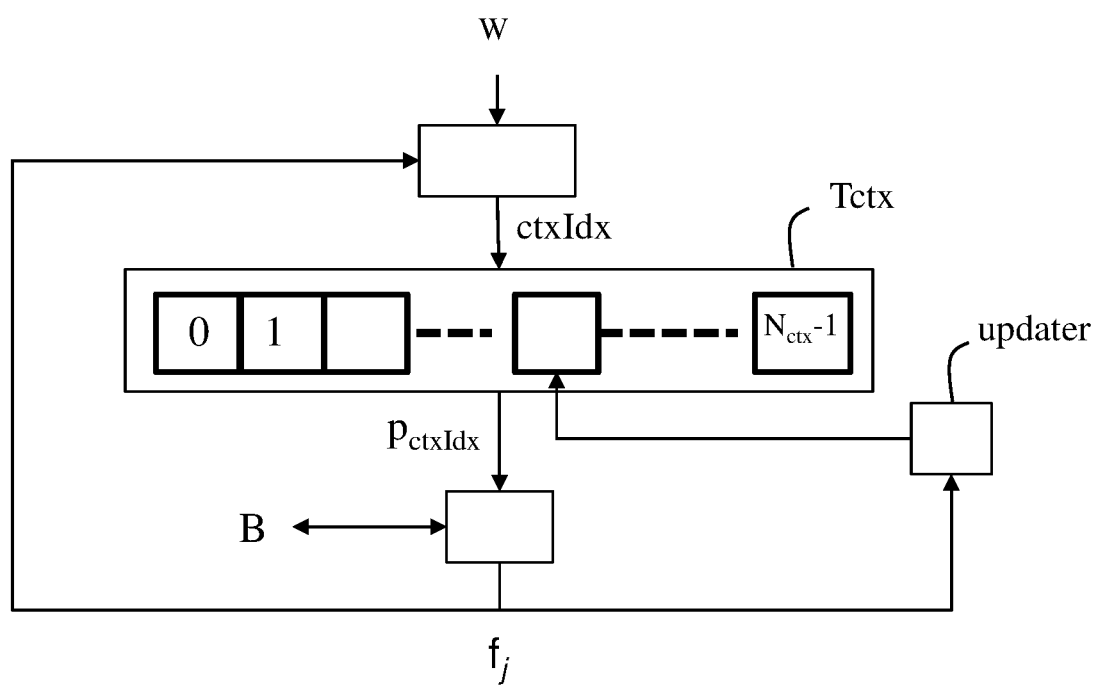
FIG. 15 shows a schematic block diagram of steps of a Context Adaptive Binary Arithmetic Coder in accordance with at least one embodiment.

In one embodiment, illustrated on FIG. 15, the binary data $S_{next}$ may be entropy encoded (decoded) using a context adaptive binary arithmetic coding (CABAC).

In one variant, a context ctxIdx may be selected based on the binary data $S_{next,i}$ associated with N precedingly encoded (decoded) occupied coarse points. For example, a N-bit word W formed by concatenating the N (for instance N=3) binary data $S_{next,i}$ is formed.

A context table Tctx with $N_{ctx}$ entries usually store probabilities associated with the contexts and a probability $p_{ctxIdx}$ is obtained as the ctxIdx-th entry of the context table. The context is selected based on the context index ctxIdx by Ctx=Tctx[ctxIdx].

For example, the context index ctxIdx may correspond to the N-bit word W. The context Ctx is then selected as Ctx=Tctx[W]

The binary data $S_{next}$ is entropy encoded in (decoded from) the bitstream B, using the probability $p_{ctxIdx}$.

Entropy (de) coders are usually arithmetic (de) coders but may be any other type of entropy (de) coders like asymmetric numeral systems. In any case, optimal coders add $-\log 2 (p_{ctxIdx})$ bits in the bitstream B to encode $S_{next}=1$ or $-\log 2 (1-p_{ctxIdx})$ bits in the bitstream B to encode $S_{next}=0$. Once the binary data $S_{next}$ is encoded (decoded), the probability $p_{ctxIdx}$ is updated by using an updater taking the encoded (decoded) binary data $S_{next}$ and $p_{ctxIdx}$ as entries; the updater is usually performed by using update tables. The updated probability replaces the ctxIdx-th entry of the context table $T_{ctx}$. Then, another binary data $S_{next}$ can be encoded (decoded), and so on. The update loop back to the context table is a bottleneck in the coding workflow as another binary data $S_{next}$ can be encoded (decoded) only after the update has been performed. For this reason, the memory access to the context table must be as quick as possible and minimizing the size of the context table helps easing its hardware implementation.

Selecting an adequate context, i.e. the probability $p_{ctxIdx}$ that estimates at best the chance of the binary data $S_{next}$ to be equals to 1, is essential to obtain good compression. Therefore, the context selection should use at least one binary data $S_{next,i}$ associated with the N last precedingly encoded (decoded) occupied coarse points, and correlation between them to obtain this adequate context.

In one variant, the context index ctxIdx may be obtained from the binary data $S_{next,i}$ associated with N last precedingly encoded (decoded) occupied coarse points having sensor indices that belong to a determined group of sensor indices.

In one variant, groups of consecutive sensors may be formed.

For example, if a sensor head comprises 32 sensors (32 sensor indices), each group may comprise 4 successive sensor indices: {0, 1, 2, 3}, {4, 5, 6, 7}, . . . , {28, 29, 30, 31}. Then, a N-bit buffer may be used for each group, and the buffer of a group is updated each time a binary data $S_{next}$ has been encoded (decoded) for a sensor belonging to the group.

In one variant, each group may contain a unique sensor.

In one variant, the contexts may be specific to each group of sensor indices.

A Context-Adaptive Binary Arithmetic decoder performs essentially the same operations as the Context-Adaptive Binary Arithmetic encoder except that the coded binary data $S_{next}$ is decoded from the bitstream B by an entropy decoder using the probability $p_{ctxIdx}$.

Figure 16:
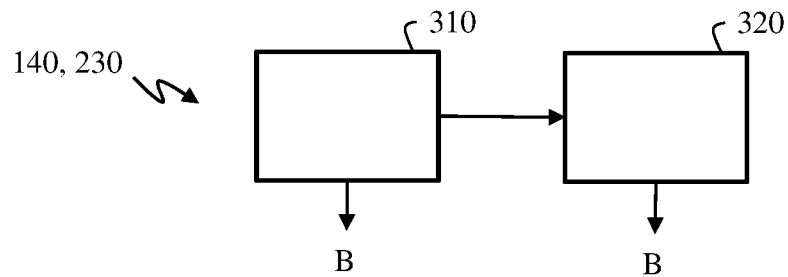
FIG. 16 shows a schematic block diagram of step 140 of the method 100 and step 230 of the method 200 in accordance with at least one embodiment.

In one embodiment, illustrated on FIG. 16, the amplitude $|\Delta o_{late}|$ (or in variant, the amplitude $|\Delta o_{late}|$ minus 1) of the late point order index difference $\Delta o_{late}$ may be encoded (step 140) by encoding (decoded by decoding, step 230) a first positive offset (step 310) associated with a first coordinate of the two-dimensional space, and encoding (decoding) a second positive offset (step 320) associated with a second coordinate of the two-dimensional space.

When the two-dimensional coordinate space is the two-dimensional coordinate ($\phi$, $\lambda$) space, the first positive offset is a positive azimuthal angle offset $\phi_{offset}$ and the second positive offset is a positive sensor index offset $\lambda_{offset}$.

The late point order index difference $\Delta o_{late}$ is then obtained by:

$$\Delta o_{late} = -\phi_{offset} * N_{sensor} - \lambda_{offset} - 1 \qquad (7)$$

with $N_{sensor}$ being the number of sensor of a sensor head.

In one embodiment of step 310, the positive azimuthal angle offset $\phi_{offset}$ may be encoded by an expGolomb code.

In one embodiment of step 310, the positive azimuthal angle offset $\phi_{offset}$ may be entropy encoded (decoded) based on adaptive context selection.

In one variant, the positive azimuthal angle offset Øoffset may be binarized in a series of binary data $b_{k1}$. In one example, the series of binary data $b_{k1}$ is a unary representation of the positive azimuthal angle offset $\phi_{offset}$, with k1 ranging from 0 to $\phi_{offset}$ (i.e. it is a sequence of $\phi_{offset}$ successive binary data equal to 1 followed by one binary data equal to 0, or alternatively a sequence of $\phi_{offset}$ binary data equal to 0 followed by one binary data equal to 1). Each binary data $b_{k1}$ is entropy encoded using a same context. The series of binary data $b_{k1}$ is entropy decoded and the positive azimuthal angle offset $\phi_{offset}$ is reconstructed from the series of decoded binary data $b_{k1}$.

In one variant, the entropy coding context used to encode or decode each bit $b_{k1}$ may be selected based on a function of the index k1, for instance min (k1, 1).

When the two-dimensional coordinate space is the two-dimensional coordinate (s, $\lambda$) space, the first positive offset is a positive sample index offset $s_{offset}$ and the second offset is the positive sensor index offset $\lambda_{offset}$.

The late point order index difference $\Delta o_{late}$ is then obtained by;

$$\Delta o_{late} = (-s_{offset} - 1) * N_{sensor} + \lambda_{offset} \quad (8)$$

This variant (equation 8) is advantageous when imposing that the sensor index offset $\lambda_{offset}$ is positive. This leads to easier coding (and better compression) in case points are properly ordered by sensor index.

In one embodiment of step 310, the positive sample index offset $s_{offset}$ may be encoded by an expGolomb code.

In one embodiment of step 310, the positive sample index offset $s_{offset}$ may be entropy coded (decoded) based on adaptive context selection.

In one variant, the positive sample index offset $s_{offset}$ may be binarized in a series of binary data $b_{k2}$ to obtain, for example, a unary representation of the positive sample index offset $s_{offset}$ (with k2 ranging from 0 to $s_{offset}$). Each binary data $b_{k2}$ is entropy encoded using a same context. The series of binary data $b_{k2}$ is entropy decoded and the positive sample index offset $s_{offset}$ is reconstructed from the series of decoded binary data $b_{k2}$.

In one embodiment of step 320, the positive sensor index offset Δoffset may be encoded by an expGolomb code.

In one embodiment of step 320, the positive sensor index offset $\lambda_{offset}$ may be entropy encoded (decoded) based on adaptive context selection.

In one variant, the positive sensor index offset $\lambda_{offset}$ may be binarized in a series of binary data $b_{k3}$ to obtain, for example, a unary representation of the positive sensor index offset $\lambda_{offset}$ (with k3 ranging from 0 to $\lambda_{offset}$). Each binary data $b_{k3}$ is entropy encoded using a context. The series of binary data $b_{k3}$ is entropy decoded and the positive sensor index offset $\lambda_{offset}$ is reconstructed from the series of decoded binary data $b_{k3}$.

In one variant, contexts may be selected based on the binary data index k3 and/or a N-bit word W1 formed by concatenating the N (for instance N=1 or N=2) binary data $S_{next,i}$ associated with N last precedingly encoded (decoded) occupied coarse points having sensor indices that belong to a determined group of sensor indices.

In one variant, the context for coding the binary data with index k3 may also be selected based on the index of the group of sensor indices to which belong the sensor with index $(\lambda_{ref}+k3)$ modulo $N_{sensor}$ where $\lambda_{ref}$ is the sensor index associated with the second reference coarse point $P'_{ref}$.

It is to be noted that the equation (7) and related embodiments could be easily adapted for the two-dimensional coordinate space being the two-dimensional coordinate (s, λ) space using a reformulation replacing offset by $s_{offset}$. Also, the equation (8) and related embodiments could be easily adapted for the two-dimensional coordinate space being the two-dimensional coordinate (φ, λ) space using a reformulation replacing $s_{offset}$ by $\phi_{offset}$.

Figure 17:
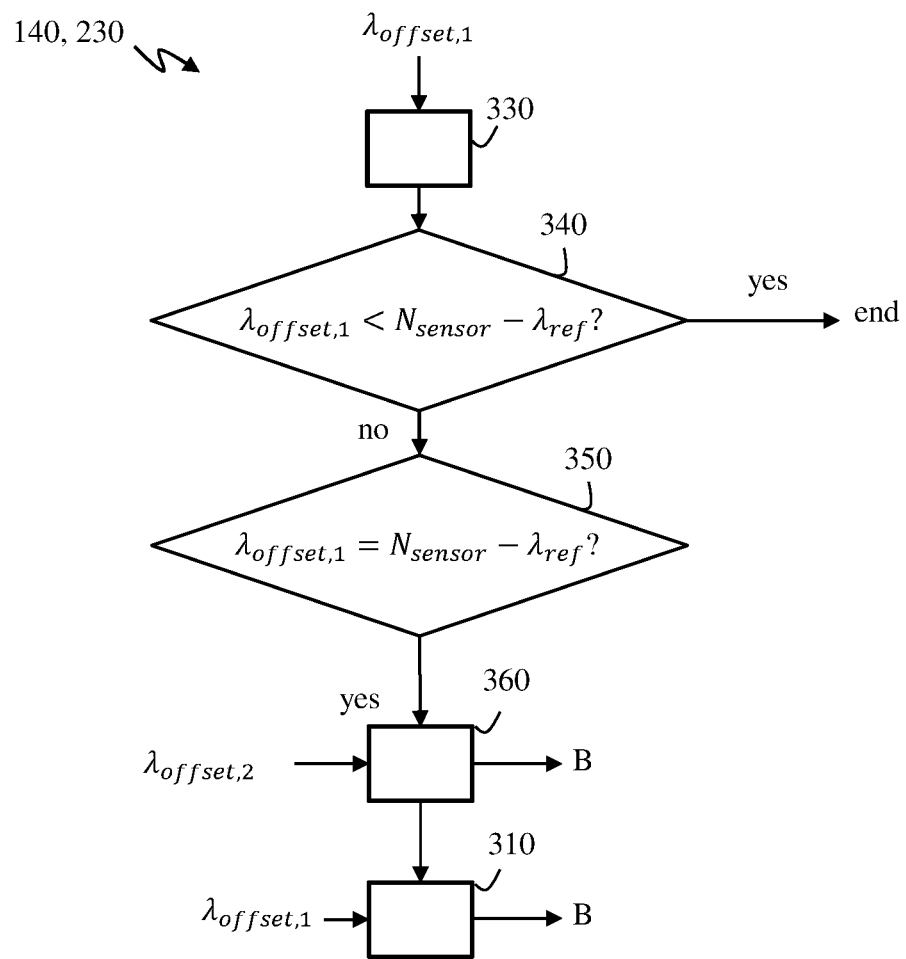
FIG. 17 shows a schematic block diagram of step 140 of the method 100 and step 230 of the method 200 in accordance with at least one embodiment.

In one embodiment, illustrated on FIG. 17, the amplitude $|\Delta o_{late}|$ (or in variant the amplitude $|\Delta o_{late}|$ minus 1) of the late point order index difference $\Delta o_{late}$ may be encoded (step 140) by encoding (decoded by decoding, step 230) the first positive offset (step 310), and encoding the positive sensor index offset $\lambda_{offset}$ by encoding two positive values $\lambda_{offset,1}$ and $\lambda_{offset,2}$ relatively to the sensor index $\lambda_{ref}$. The positive values $\lambda_{offset,1}$ and $\lambda_{offset,2}$ are determined such as their sum equal to the positive sensor offset $\lambda_{offset}$: $\lambda_{offset}=\lambda_{offset,1}+\lambda_{offset,2}$, and such as $$\lambda_{offset,1} \leq N_{laser} - \lambda_{ref}$$

$$\lambda_{offset,2} = 0 \text{ if } \lambda_{offset,1} < N_{laser} - \lambda_{ref}$$

$$\lambda_{offset,2} \geq 0 \text{ if } \lambda_{offset,1} = N_{laser} - \lambda_{ref}$$

In step 330, the first positive value $\lambda_{offset,1}$ may be encoded into (decoded from) the bitstream B.

In step 340, if $\lambda_{offset,1} < N_{sensor} - \lambda_{ref}$, then the encoding (decoding) of the positive sensor index offset $\lambda_{offset}$ may end ($\lambda_{offset,2}=0$).

In step 350, if $\lambda_{offset,1} = N_{sensor} - \lambda_{ref}$ then the second positive value $\lambda_{offset,2}$ may be encoded into (decoded from) the bitstream B (step 360).

In one variant, the first positive offset may not be encoded before the positive sensor index offset $\lambda_{offset}$, in step 350, if $\lambda_{offset,1} = N_{sensor} - \lambda_{ref}$, then the first positive offset is encoded into (decoded from) the bitstream B (step 310). If $\lambda_{offset,1} < N_{sensor} - \lambda_{ref}$ the first positive offset is considered to be equal to zero.

In one variant, the first positive offset may be encoded into (decoded from) the bitstream B (step 310) after the first positive value $\lambda_{offset,1}$ has been encoded but before the second positive value $\lambda_{offset,2}$ is encoded. i.e. after step 350 and before step 360, if $\lambda_{offset,1} = N_{sensor} - \lambda_{ref}$.

In one variant, the positive sensor index offset $\lambda_{offset}$ may be further restricted to be lower than the number of sensors $N_{sensor}$.

In one embodiment of step 330, the positive offset value $\lambda_{offset,1}$ may be entropy encoded (decoded) based on adaptive context selection.

In one variant, the positive offset value $\lambda_{offset,1}$ may be binarized in a series of binary data $b_{k4}$ to obtain, for example, a unary representation of the positive offset value $\lambda_{offset,1}$ (with k4 ranging from 0 to $\lambda_{offset,1}$). Each binary data $b_{k4}$ is entropy encoded using a context. The series of binary data $b_{k4}$ is entropy decoded and the positive offset value $\lambda_{offset,1}$ is reconstructed from the series of decoded binary data $b_{k4}$.

In one variant where the positive offset value $\lambda_{offset,1}$ may be binarized in a series of binary data $b_{k4}$ to obtain a unary representation of the positive offset value $\lambda_{offset,1}$, if $\lambda_{offset,1} = N_{sensor} - \lambda_{ref}$, k4 may range from 0 to $\lambda_{offset,1}-1$ only: the last bit of the unary representation can be omitted. This is because higher values of the positive offset value $\lambda_{offset,1}$ are not possible/allowed.

In one variant, contexts may be selected based on a sensor index $\lambda_{ref}+k4$ or, in variant, on an index of a group of sensors indices comprising the sensor index $\lambda_{ref}+k4$.

In one variant, contexts may be further selected based on the data $S_{next,i}$ indicating if a precedingly encoded (decoded) occupied coarse point $P_i$ is a late occupied coarse point, said occupied coarse point $P_i$ is associated with a precedingly encoded (decoded) point of the point cloud for which the sensor index associated with the order index of the second reference coarse point $P'_{ref(i)}$ used to compute the late point order index difference $\Delta o_{late(i)}$ for that said occupied coarse point $P_i$ was equal to the sensor index $\lambda_{ref}$, or in a variant, was belonging to a group of sensors indices comprising the sensor index $\lambda_{ref}$.

In one variant, context may be further selected based on a function of k4.

For example, the function may be equal to min (k4,2).

In one embodiment of step 360, the positive offset value $\lambda_{offset,2}$ may be entropy encoded (decoded) based on adaptive context selection.

In one variant, the positive offset value offset,2 may be binarized in a series of binary data $b_{k5}$ to obtain, for example, a unary representation of the positive offset value $\lambda_{offset,2}$ (with k5 ranging from 0 to $\lambda_{offset,2}$). Each binary data $b_{k5}$ is entropy encoded using a context. The series of binary data $b_{k5}$ is entropy decoded and the positive offset value $\lambda_{offset,2}$ is reconstructed from the series of decoded binary data $b_{k5}$.

In one variant, contexts may be further selected based on the data $S_{next,i}$ indicating if a precedingly encoded (decoded) occupied coarse point $P_i$ is a late occupied coarse point, said occupied coarse point $P_i$ is associated with a precedingly encoded (decoded) point of the point cloud for which the sensor index associated with the order index of the second reference coarse point $P'_{ref(i)}$ used to compute the late point order index difference $\Delta o_{late(i)}$ for that said occupied coarse point $P_i$ was equal to the sensor index $\lambda_{ref}$, or in a variant, was belonging to a group of sensors indices comprising the sensor index $\lambda_{ref}$.

In one variant, context may be further selected based on a function of j.

For example, the function may be equal to min ($\lambda_{offset,2}$+ k5,2).

In one variant, the context table used to code $\lambda_{offset,1}$ may also be used to code $\lambda_{offset,2}$.

Figure 18:
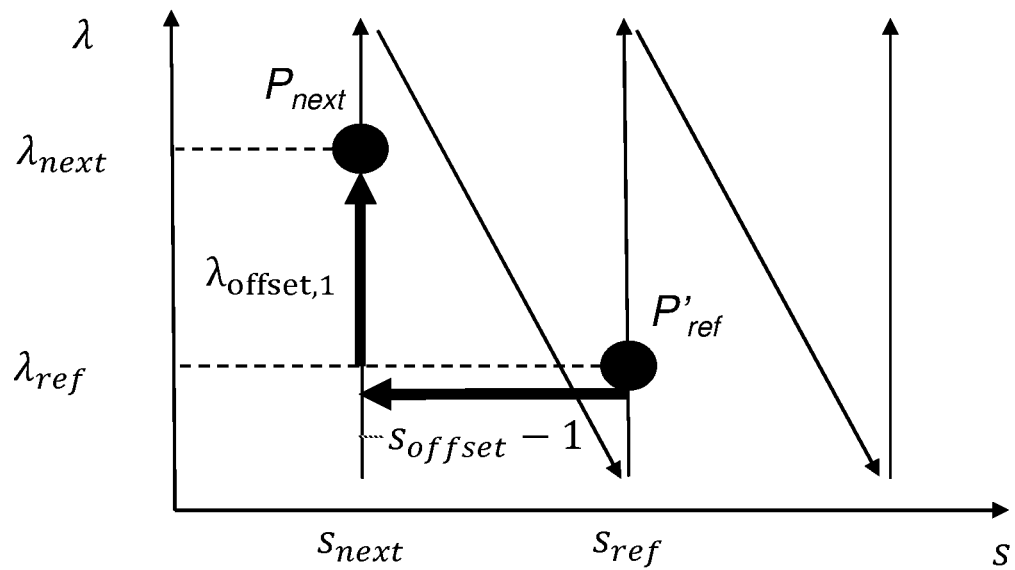
FIG. 18 shows an example of determining the first positive offset and a positive value when the next occupied coarse point and the reference occupied coarse point have different sample indices in accordance with at least one embodiment.

FIG. 18 shows an example of determining the first positive offset $s_{offset}$ and the positive value $\lambda_{offset,2}$ when the next occupied coarse point $P_{next}$ has a sample index $S_{next}$ equals $S_{ref}$-1, where $S_{ref}$ is the sample index of the second reference coarse point $P'_{ref}$, and has a sensor index $\lambda_{next}$ greater than $\lambda_{ref}$, the sensor index of the second reference coarse point $P'_{ref}$.

In the illustrative example, $\lambda_{offset,1} \leq N_{sensor} - \lambda_{ref}$ (step 340). Then, the second positive value $\lambda_{offset,2}$ is determined to be equal to 0, and the first positive offset $s_{offset}$ is also determined to be equal to 0.

In this example, the first positive value $\lambda_{offset,1}$ to be encoded (decoded) is greater than 0 ($\lambda_{next} > \lambda_{ref}$). The positive sample index offset $s_{offset}$=0 and the order index difference $\Delta o$ is given by equation (8).

Figure 19:
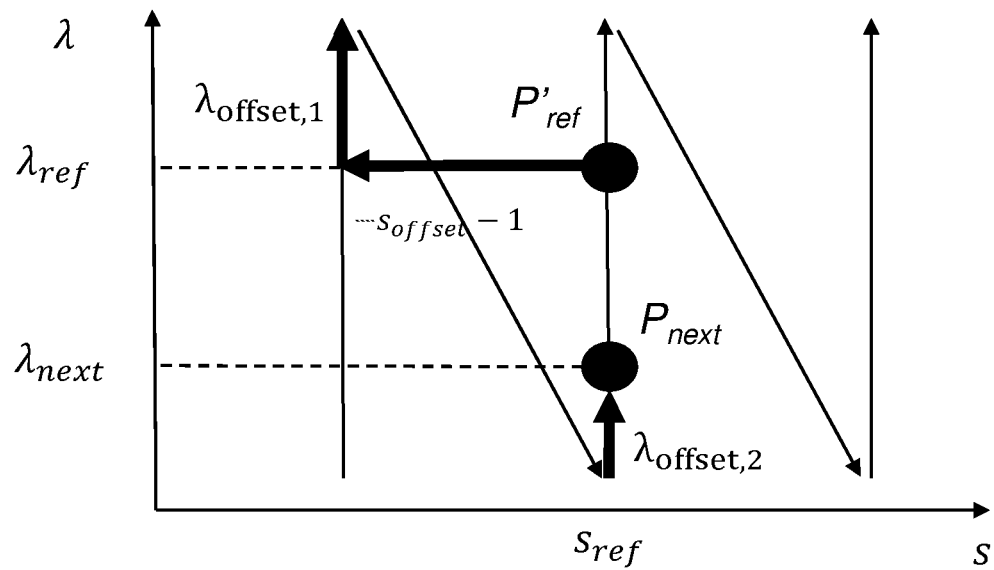
FIG. 19 shows an example of determining the first positive offset and a positive value when the next occupied coarse point and the reference occupied coarse point have same sample indices in accordance with at least one embodiment.

FIG. 19 shows an example of determining the first positive offset $s_{offset}$ and the positive value $\lambda_{offset,2}$ when the next occupied coarse point $P_{next}$ and the second reference coarse point $P'_{ref}$ have a same sample index. The sample index offset $s_{offset}$ IS equal to 0.

In the illustrative example, $\lambda_{offset,1} = N_{sensor} - \lambda_{ref}$ (step 350). Then, the second positive value $\lambda_{offset,2}$ is encoded into the bitstream B. The positive sample index offset $s_{offset}$=0 and the order index difference $\Delta o$ is given by equation (8).

Figure 20:
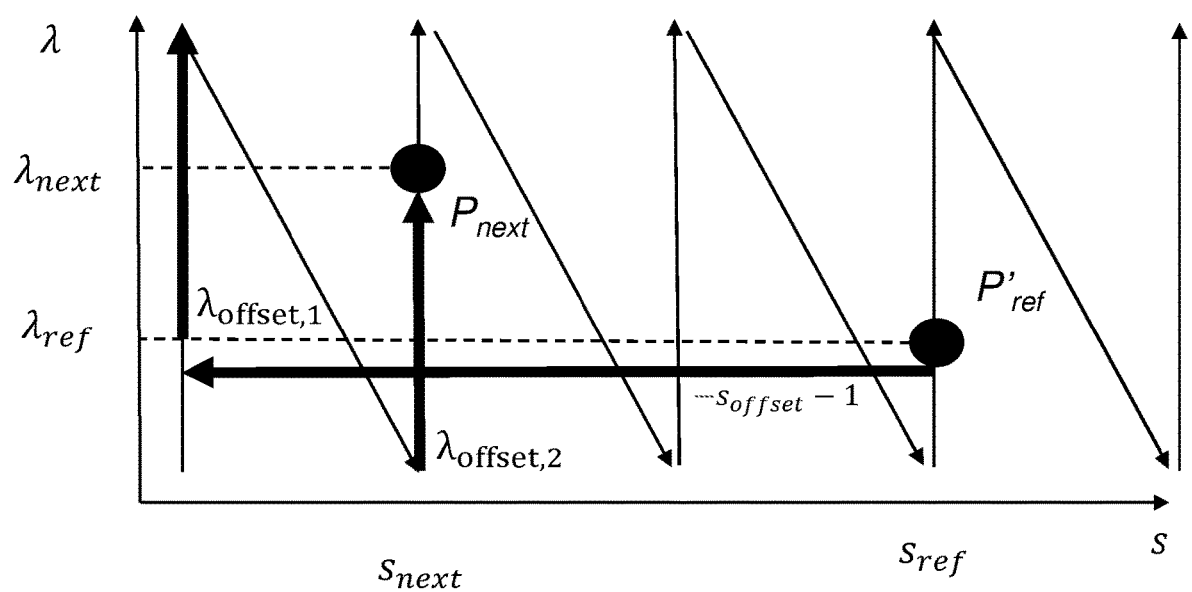
FIG. 20 shows an example of determining the first positive offset and a positive value when the next occupied coarse point and the reference occupied coarse point have different sample indices in accordance with at least one embodiment.

FIG. 20 shows an example of determining the first positive offset $s_{offset}$ and the positive value $\lambda_{offset,2}$ when the next occupied coarse point $P_{next}$ has a sample index $S_{next}$ equals $s_{ref}$-2 where $S_{ref}$ is the sample index of a second reference coarse point $P'_{ref}$.

In the illustrative example, $\lambda_{offset,1} = N_{sensor} - \lambda_{last}$ (step 350). Then, the second positive value $\lambda_{offset,2}$ is encoded into the bitstream B. The positive sample index offset $s_{offset}$ is equal to 2 and the order index difference $\Delta o$ is given by equation (8).

Figure 21:
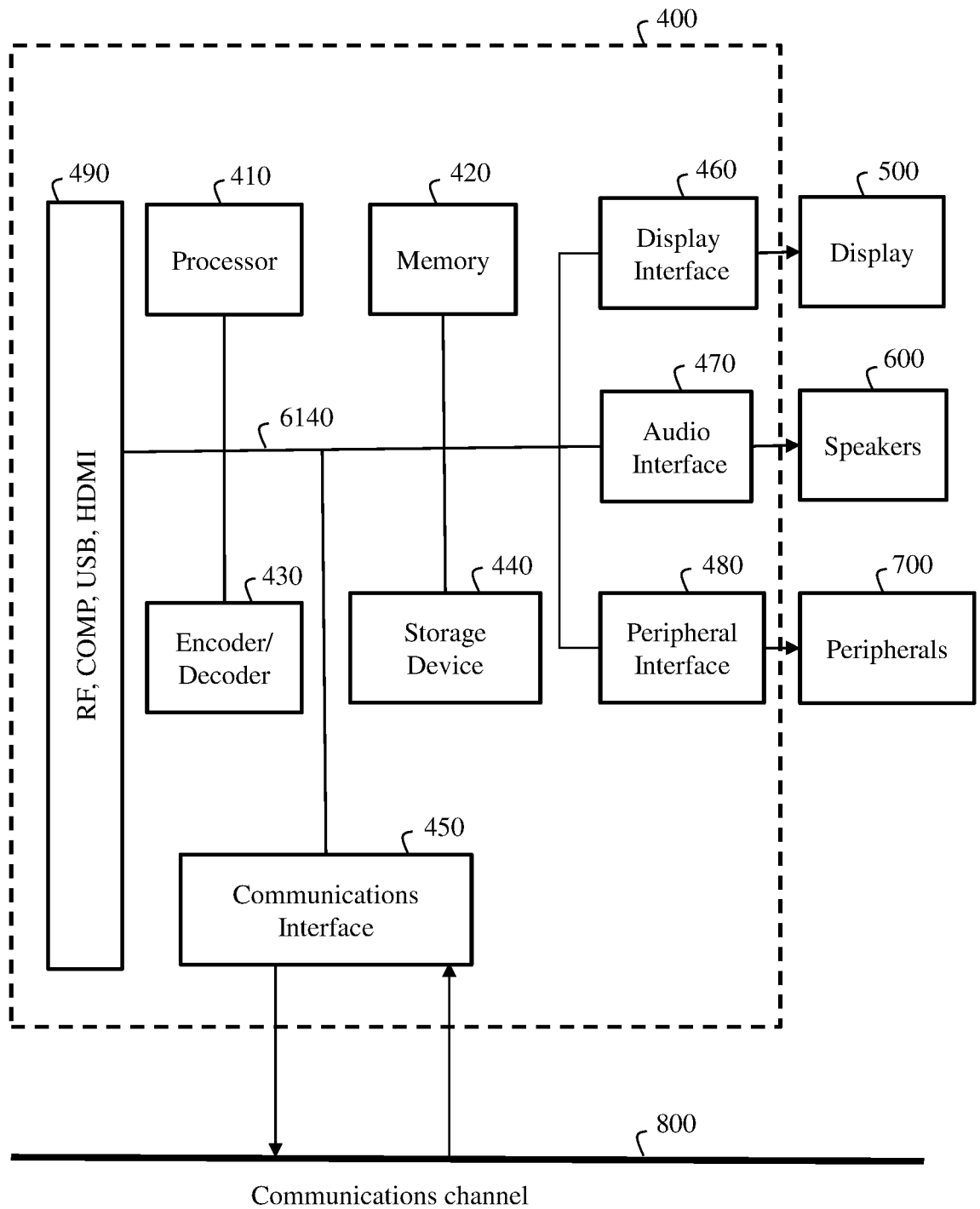
FIG. 21 illustrates a schematic block diagram of an example of a system in which various aspects and embodiments are implemented.

FIG. 21 shows a schematic block diagram illustrating an example of a system in which various aspects and embodiments are implemented.

System 400 may be embedded as one or more devices including the various components described below. In various embodiments, the system 400 may be configured to implement one or more of the aspects described in the present application.

Examples of equipment that may form all or part of the system 400 include personal computers, laptops, smartphones, tablet computers, digital multimedia set top boxes, digital television receivers, personal video recording systems, connected home appliances, connected vehicles and their associated processing systems, head mounted display devices (HMD, see-through glasses), projectors (beamers), "caves" (system including multiple displays), servers, video encoders, video decoders, post-processors processing output from a video decoder, pre-processors providing input to a video encoder, web servers, set-top boxes, and any other device for processing a point cloud, a video or an image or other communication devices. Elements of system 400, singly or in combination, may be embodied in a single integrated circuit (IC), multiple ICs, and/or discrete components. For example, in at least one embodiment, the processing and encoder/decoder elements of system 400 may be distributed across multiple ICs and/or discrete components. In various embodiments, the system 400 may be communicatively coupled to other similar systems, or to other electronic devices, via, for example, a communications bus or through dedicated input and/or output ports.

The system 400 may include at least one processor 410 configured to execute instructions loaded therein for implementing, for example, the various aspects described in the present application. Processor 410 may include embedded memory, input output interface, and various other circuitries as known in the art. The system 400 may include at least one memory 420 (for example a volatile memory device and/or a non-volatile memory device). System 400 may include a storage device 440, which may include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random-Access Memory (DRAM), Static Random-Access Memory (SRAM), flash, magnetic disk drive, and/or optical disk drive. The storage device 440 may include an internal storage device, an attached storage device, and/or a network accessible storage device, as non-limiting examples.

The system 400 may include an encoder/decoder module 430 configured, for example, to process data to provide encoded/decoded point cloud geometry data, and the encoder/decoder module 430 may include its own processor and memory. The encoder/decoder module 430 may represent module(s) that may be included in a device to perform the encoding and/or decoding functions. As is known, a device may include one or both encoding and decoding modules. Additionally, encoder/decoder module 430 may be implemented as a separate element of system 400 or may be incorporated within processor 410 as a combination of hardware and software as known to those skilled in the art.

Program code to be loaded onto processor 410 or encoder/decoder 430 to perform the various aspects described in the present application may be stored in storage device 440 and subsequently loaded onto memory 420 for execution by processor 410. In accordance with various embodiments, one or more of processor 410, memory 420, storage device 440, and encoder/decoder module 430 may store one or more of various items during the performance of the processes described in the present application. Such stored items may include, but are not limited to, a point cloud frame, encoded/decoded geometry/attributes videos/images or portions of the encoded/decoded geometry/attribute video/images, a bitstream, matrices, variables, and intermediate or final results from the processing of equations, formulas, operations, and operational logic.

In several embodiments, memory inside of the processor 410 and/or the encoder/decoder module 430 may be used to store instructions and to provide working memory for processing that may be performed during encoding or decoding.

In other embodiments, however, a memory external to the processing device (for example, the processing device may be either the processor 410 or the encoder/decoder module 430) may be used for one or more of these functions. The external memory may be the memory 420 and/or the storage device 440, for example, a dynamic volatile memory and/or a non-volatile flash memory. In several embodiments, an external non-volatile flash memory may be used to store the operating system of a television. In at least one embodiment, a fast external dynamic volatile memory such as a RAM may be used as working memory for video coding and decoding operations, such as for MPEG-2 part 2 (also known as ITU-T Recommendation H.262 and ISO/IEC 13818-2, also known as MPEG-2 Video), HEVC (High Efficiency Video coding), VVC (Versatile Video Coding), or MPEG-I part 5 or part 9.

The input to the elements of system 400 may be provided through various input devices as indicated in block 490. Such input devices include, but are not limited to, (i) an RF portion that may receive an RF signal transmitted, for example, over the air by a broadcaster, (ii) a Composite input terminal, (iii) a USB input terminal, and/or (iv) an HDMI input terminal.

In various embodiments, the input devices of block 490 may have associated respective input processing elements as known in the art. For example, the RF portion may be associated with elements necessary for (i) selecting a desired frequency (also referred to as selecting a signal, or band-limiting a signal to a band of frequencies), (ii) down-converting the selected signal, (iii) band-limiting again to a narrower band of frequencies to select (for example) a signal frequency band which may be referred to as a channel in certain embodiments, (iv) demodulating the down-converted and band-limited signal, (v) performing error correction, and (vi) demultiplexing to select the desired stream of data packets. The RF portion of various embodiments may include one or more elements to perform these functions, for example, frequency selectors, signal selectors, band-limiters, channel selectors, filters, downconverters, demodulators, error correctors, and de-multiplexers. The RF portion may include a tuner that performs various of these functions, including, for example, down-converting the received signal to a lower frequency (for example, an intermediate frequency or a near-baseband frequency) or to baseband.

In one set-top box embodiment, the RF portion and its associated input processing element may receive an RF signal transmitted over a wired (for example, cable) medium. Then, the RF portion may perform frequency selection by filtering, down-converting, and filtering again to a desired frequency band.

Various embodiments rearrange the order of the above-described (and other) elements, remove some of these elements, and/or add other elements performing similar or different functions.

Adding elements may include inserting elements in between existing elements, such as, for example, inserting amplifiers and an analog-to-digital converter. In various embodiments, the RF portion may include an antenna.

Additionally, the USB and/or HDMI terminals may include respective interface processors for connecting system 400 to other electronic devices across USB and/or HDMI connections. It is to be understood that various aspects of input processing, for example, Reed-Solomon error correction, may be implemented, for example, within a separate input processing IC or within processor 410 as necessary. Similarly, aspects of USB or HDMI interface processing may be implemented within separate interface ICs or within processor 410 as necessary. The demodulated, error corrected, and demultiplexed stream may be provided to various processing elements, including, for example, processor 410, and encoder/decoder 430 operating in combination with the memory and storage elements to process the data stream as necessary for presentation on an output device.

Various elements of system 400 may be provided within an integrated housing. Within the integrated housing, the various elements may be interconnected and transmit data therebetween using suitable connection arrangement 490, for example, an internal bus as known in the art, including the I2C bus, wiring, and printed circuit boards.

The system 400 may include communication interface 450 that enables communication with other devices via communication channel 800. The communication interface 450 may include, but is not limited to, a transceiver configured to transmit and to receive data over communication channel 800. The communication interface 450 may include, but is not limited to, a modem or network card and the communication channel 800 may be implemented, for example, within a wired and/or a wireless medium.

Data may be streamed to the system 400, in various embodiments, using a Wi-Fi network such as IEEE 802.11. The Wi-Fi signal of these embodiments may be received over the communications channel 800 and the communications interface 450 which are adapted for Wi-Fi communications. The communications channel 800 of these embodiments may be typically connected to an access point or router that provides access to outside networks including the Internet for allowing streaming applications and other over-the-top communications.

Other embodiments may provide streamed data to the system 400 using a set-top box that delivers the data over the HDMI connection of the input block 490.

Still other embodiments may provide streamed data to the system 400 using the RF connection of the input block 490.

The streamed data may be used as a way for signaling information used by the system 400. The signaling information may comprise the bitstream B and/or information such a number of points of a point cloud, coordinates and/or sensor setup parameters.

It is to be appreciated that signaling may be accomplished in a variety of ways. For example, one or more syntax elements, flags, and so forth may be used to signal information to a corresponding decoder in various embodiments.

The system 400 may provide an output signal to various output devices, including a display 500, speakers 600, and other peripheral devices 700. The other peripheral devices 700 may include, in various examples of embodiments, one or more of a stand-alone DVR, a disk player, a stereo system, a lighting system, and other devices that provide a function based on the output of the system 400.

In various embodiments, control signals may be communicated between the system 400 and the display 500, speakers 600, or other peripheral devices 700 using signaling such as AV.Link (Audio/Video Link), CEC (Consumer Electronics Control), or other communications protocols that enable device-to-device control with or without user intervention.

The output devices may be communicatively coupled to system 400 via dedicated connections through respective interfaces 460, 470, and 480.

Alternatively, the output devices may be connected to system 400 using the communications channel 800 via the communications interface 450. The display 500 and speakers 600 may be integrated in a single unit with the other components of system 400 in an electronic device such as, for example, a television.

In various embodiments, the display interface 460 may include a display driver, such as, for example, a timing controller (T Con) chip.

The display 500 and speaker 600 may alternatively be separate from one or more of the other components, for example, if the RF portion of input 490 is part of a separate set-top box. In various embodiments in which the display 500 and speakers 600 may be external components, the output signal may be provided via dedicated output connections, including, for example, HDMI ports, USB ports, or COMP outputs.

In FIGS. 1-21, various methods are described herein, and each of the methods includes one or more steps or actions for achieving the described method. Unless a specific order of steps or actions is required for proper operation of the method, the order and/or use of specific steps and/or actions may be modified or combined.

Some examples are described with regard to block diagrams and/or operational flowcharts. Each block represents a circuit element, module, or portion of code which includes one or more executable instructions for implementing the specified logical function(s). It should also be noted that in other implementations, the function(s) noted in the blocks may occur out of the indicated order. For example, two blocks shown in succession may, in fact, be executed substantially concurrently or the blocks may sometimes be executed in the reverse order, depending on the functionality involved.

The implementations and aspects described herein may be implemented in, for example, a method or a process, an apparatus, a computer program, a data stream, a bitstream, or a signal. Even if only discussed in the context of a single form of implementation (for example, discussed only as a method), the implementation of features discussed may also be implemented in other forms (for example, an apparatus or computer program).

The methods may be implemented in, for example, a processor, which refers to processing devices in general, including, for example, a computer, a microprocessor, an integrated circuit, or a programmable logic device. Processors also include communication devices.

Additionally, the methods may be implemented by instructions being performed by a processor, and such instructions (and/or data values produced by an implementation) may be stored on a computer readable storage medium. A computer readable storage medium may take the form of a computer readable program product embodied in one or more computer readable medium(s) and having computer readable program code embodied thereon that is executable by a computer. A computer readable storage medium as used herein may be considered a non-transitory storage medium given the inherent capability to store the information therein as well as the inherent capability to provide retrieval of the information therefrom. A computer readable storage medium may be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present embodiments may be applied, is merely an illustrative and not an exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The instructions may form an application program tangibly embodied on a processor-readable medium.

Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

An apparatus may be implemented in, for example, appropriate hardware, software, and firmware. Examples of such apparatus include personal computers, laptops, smartphones, tablet computers, digital multimedia set top boxes, digital television receivers, personal video recording systems, connected home appliances, head mounted display devices (HMD, see-through glasses), projectors (beamers), "caves" (system including multiple displays), servers, video encoders, video decoders, post-processors processing output from a video decoder, pre-processors providing input to a video encoder, web servers, set-top boxes, and any other device for processing a point cloud, a video or an image or other communication devices. As should be clear, the equipment may be mobile and even installed in a mobile vehicle.

Computer software may be implemented by the processor 410 or by hardware, or by a combination of hardware and software. As a non-limiting example, the embodiments may be also implemented by one or more integrated circuits. The memory 420 may be of any type appropriate to the technical environment and may be implemented using any appropriate data storage technology, such as optical memory devices, magnetic memory devices, semiconductor-based memory devices, fixed memory, and removable memory, as non-limiting examples. The processor 410 may be of any type appropriate to the technical environment, and may encompass one or more of microprocessors, general purpose computers, special purpose computers, and processors based on a multi-core architecture, as non-limiting examples.

As will be evident to one of ordinary skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The terminology used herein is for the purpose of describing particular embodiments only and is not intended to be limiting. As used herein, the singular forms "a", "an", and "the" may be intended to include the plural forms as well, unless the context clearly indicates otherwise. It will be further understood that the terms "includes/comprises" and/or "including/comprising" when used in this specification, may specify the presence of stated, for example, features, integers, steps, operations, elements, and/or components but do not preclude the presence or addition of one or more other features, integers, steps, operations, elements, components, and/or groups thereof. Moreover, when an element is referred to as being "responsive" or "connected" to another element, it may be directly responsive or connected to the other element, or intervening elements may be present. In contrast, when an element is referred to as being "directly responsive" or "directly connected" to other element, there are no intervening elements present.

It is to be appreciated that the use of any of the symbol/term "/", "and/or", and "at least one of", for example, in the cases of "A/B", "A and/or B" and "at least one of A and B", may be intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Various numeric values may be used in the present application. The specific values may be for example purposes and the aspects described are not limited to these specific values.

It will be understood that, although the terms first, second, etc. may be used herein to describe various elements, these elements are not limited by these terms. These terms are only used to distinguish one element from another. For example, a first element could be termed a second element, and, similarly, a second element could be termed a first element without departing from the teachings of this application. No ordering is implied between a first element and a second element.

Reference to "one embodiment" or "an embodiment" or "some embodiments" or "one implementation" or "an implementation", as well as other variations thereof, is frequently used to convey that a particular feature, structure, characteristic, and so forth (described in connection with the embodiment/implementation) is included in at least one embodiment/implementation. Thus, the appearances of the phrase "in one embodiment" or "in an embodiment" or "in some embodiments" or "in one implementation" or "in an implementation", as well any other variations, appearing in various places throughout this application are not necessarily all referring to the same embodiment.

Similarly, reference herein to "in accordance with an embodiment/example/implementation" or "in an embodiment/example/implementation", as well as other variations thereof, is frequently used to convey that a particular feature, structure, or characteristic (described in connection with the embodiment/example/implementation) may be included in at least one embodiment/example/implementation. Thus, the appearances of the expression "in accordance with an embodiment/example/implementation" or "in an embodiment/example/implementation" in various places in the specification are not necessarily all referring to the same embodiment/example/implementation, nor are separate or alternative embodiment/examples/implementation necessarily mutually exclusive of other embodiments/examples/implementation.

Reference numerals appearing in the claims are by way of illustration only and shall have no limiting effect on the scope of the claims. Although not explicitly described, the present embodiments/examples and variants may be employed in any combination or sub-combination.

When a figure. is presented as a flow diagram, it should be understood that it also provides a block diagram of a corresponding apparatus. Similarly, when a figure is presented as a block diagram, it should be understood that it also provides a flow diagram of a corresponding method/process.

Although some of the diagrams include arrows on communication paths to show a primary direction of communication, it is to be understood that communication may occur in the opposite direction to the depicted arrows.

Various implementations involve decoding. "Decoding", as used in this application, may encompass all or part of the processes performed, for example, on a received point cloud frame (including possibly a received bitstream which encodes one or more point cloud frames) in order to produce a final output suitable for display or for further processing in the reconstructed point cloud domain. In various embodiments, such processes include one or more of the processes typically performed by a decoder. In various embodiments, such processes also, or alternatively, include processes performed by a decoder of various implementations described in this application, for example, As further examples, in one embodiment "decoding" may refer only to de-quantizing, in one embodiment "decoding" may refer to entropy decoding, in another embodiment "decoding" may refer only to differential decoding, and in another embodiment "decoding" may refer to combinations of de-quantizing, entropy decoding and differential decoding. Whether the phrase "decoding process" may be intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application may encompass all or part of the processes performed, for example, on an input point cloud frame in order to produce an encoded bitstream. In various embodiments, such processes include one or more of the processes typically performed by an encoder. In various embodiments, such processes also, or alternatively, include processes performed by an encoder of various implementations described in this application.

As further examples, in one embodiment "encoding" may refer only to quantizing, in one embodiment "encoding" may refer only to entropy encoding, in another embodiment "encoding" may refer only to differential encoding, and in another embodiment "encoding" may refer to combinations of quantizing, differential encoding and entropy encoding. Whether the phrase "encoding process" may be intended to refer specifically to a subset of operations or generally to the broader encoding process will be clear based on the context of the specific descriptions and is believed to be well understood by those skilled in the art.

Additionally, this application may refer to "obtaining" various pieces of information. Obtaining the information may include one or more of, for example, estimating the information, calculating the information, predicting the information, or retrieving the information from memory.

Further, this application may refer to "accessing" various pieces of information. Accessing the information may include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

Also, as used herein, the word "signal" refers to, among other things, indicating something to a corresponding decoder. For example, in certain embodiments the encoder signals a particular information such a number of points of the point cloud or coordinates or sensor setup parameters. In this way, in an embodiment the same parameter may be used at both the encoder side and the decoder side. Thus, for example, an encoder may transmit (explicit signaling) a particular parameter to the decoder so that the decoder may use the same particular parameter. Conversely, if the decoder already has the particular parameter as well as others, then signaling may be used without transmitting (implicit signaling) to simply allow the decoder to know and select the particular parameter. By avoiding transmission of any actual functions, a bit savings is realized in various embodiments. It is to be appreciated that signaling may be accomplished in a variety of ways. For example, one or more syntax elements, flags, and so forth are used to signal information to a corresponding decoder in various embodiments. While the preceding relates to the verb form of the word "signal", the word "signal" may also be used herein as a noun.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method of encoding, into a bitstream, point cloud geometry data represented by ordered coarse points occupying some discrete positions of a set of discrete positions of a two-dimensional space, the ordered coarse points being ordered according to a lexicographic order based on coordinates of the two-dimensional space, wherein the method comprises:

encoding, into the bitstream, a data ($S_{next}$) indicating if an occupied coarse point ($P_{next}$) associated with a point of the point cloud is a late occupied coarse point, an occupied coarse point being considered as being a late occupied coarse point ($P_{next}$) when its order index in the lexicographic order is lower than an order index of a first reference coarse point ($P_{ref}$) associated with a previously encoded point of the point cloud; and if the data ($S_{next}$) indicates that the occupied coarse point is a late occupied coarse point ($P_{next}$), obtaining a late point order index difference ($\Delta o_{late}$) between an order index of the late occupied coarse point ($P_{next}$), and an order index of a second reference coarse point ($P'_{ref}$); and encoding, into the bitstream, an amplitude of the late point order index difference.

2. A method of decoding, from a bitstream, point cloud geometry data represented by ordered coarse points occupying some discrete positions of a set of discrete positions of a two-dimensional space, the ordered coarse points being ordered according to a lexicographic order based on coordinates of the two-dimensional space, wherein the method comprises:

decoding, from the bitstream, a data ($S_{next}$) indicating if an occupied coarse point ($P_{next}$) associated with a point of the point cloud is a late occupied coarse point, an occupied coarse point being considered as being a late occupied coarse point ($P_{next}$) when its order in the lexicographic order is lower than an order of a first reference coarse point ($P_{ref}$) associated with a previously decoded point of the point cloud; and if the data ($S_{next}$) indicates that the occupied coarse point is a late occupied coarse point ($P_{next}$), decoding, from the bitstream, an amplitude of a late point order index difference ($\Delta o_{late}$) between an order index of the late occupied coarse point ($P_{next}$), and an order index of a second reference coarse point ($P'_{ref}$).

3. The method of claim 1, wherein the first reference coarse point ($P_{ref}$) is a last encoded occupied coarse point ($P_{last}$) or a previously encoded occupied coarse point ($P_{high}$) with the highest order in the lexicographic order, and wherein the second reference coarse point ($P'_{ref}$) is either the first reference coarse point or a coarse point associated with an order equals to the order of the first reference coarse point shifted by an offset.

4. The method of claim 1, wherein the data ($S_{next}$) is a binary data indicating if an occupied coarse point ($P_{next}$) associated with a point of the point cloud is a late occupied coarse point, and is entropy encoded or based on at least one other binary data ($S_{next,i}$) indicating if at least one previously encoded occupied coarse point is a late occupied coarse point.

5. The method of claim 4, wherein the amplitude of the late point order index difference is encoded by encoding, into the bitstream two positive offsets ($\phi_{offset}$, $s_{offset}$, $\lambda_{offset}$) associated with the coordinates of the two-dimensional space.

6. The method of claim 5, wherein encoding one of the positive offsets ($\lambda_{offset}$) comprises encoding or decoding a first positive value ($\lambda_{offset,1}$) and a second positive value ($\lambda_{offset,2}$) whose the sum is equal to the positive offset ($\lambda_{offset}$).

7. The method of claim 6, wherein encoding the first or the second positive value comprises entropy encoding a series of binary data representing the first or second positive value.

8. The method of claim 6, wherein encoding or decoding the other positive offset ($\phi_{offset}$, $s_{offset}$) comprises entropy encoding a series of binary data representing the other positive offset.

9. An apparatus of encoding, into a bitstream, point cloud geometry data represented by ordered coarse points occupying some discrete positions of a set of discrete positions of a two-dimensional space, the ordered coarse points being ordered according to a lexicographic order based on coordinates of the two-dimensional space, wherein the apparatus comprises at least one processor configured to:
encode, into the bitstream, a data ($S_{next}$) indicating if an occupied coarse point ($P_{next}$) associated with a point of the point cloud is a late occupied coarse point, an occupied coarse point being a late occupied coarse point ($P_{next}$) when its order index in the lexicographic order is lower than an order index of a first reference coarse point ($P_{ref}$) associated with a previously encoded point of the point cloud; and
if the data ($S_{next}$) indicates that the occupied coarse point is a late occupied coarse point ($P_{next}$),
obtain a late point order index difference ($\Delta o_{late}$) between an order index of the late occupied coarse point ($P_{next}$), and an order index of a second reference coarse point ($P'_{ref}$); and
encode, into the bitstream, an amplitude of the late point order index difference.

10. An apparatus of decoding, from a bitstream, point cloud geometry data represented by ordered coarse points occupying some discrete positions of a set of discrete positions of a two-dimensional space, the ordered coarse points being ordered according to a lexicographic order based on coordinates of the two-dimensional space, wherein the apparatus comprises at least one processor configured to perform the method of claim 2.

11. A non-transitory storage medium carrying instructions of program code for executing the method of claim 1.

12. A non-transitory storage medium carrying instructions of program code for executing the method of claim 2.

13. The method of claim 2, wherein the first reference coarse point ($P_{ref}$) is a last decoded occupied coarse point ($P_{last}$) or a previously decoded occupied coarse point ($P_{high}$) with the highest order in the lexicographic order, and wherein the second reference coarse point ($P'_{ref}$) is either the first reference coarse point or a coarse point associated with an order equals to the order of the first reference coarse point shifted by an offset.

14. The method of claim 2, wherein the data ($S_{next}$) is a binary data indicating if an occupied coarse point ($P_{next}$) associated with a point of the point cloud is a late occupied coarse point, and is entropy decoded based on at least one other binary data ($S_{next,i}$) indicating if at least one previously decoded occupied coarse point is a late occupied coarse point.

15. The method of claim 14, wherein the amplitude of the late point order index difference is decoded by decoding, from the bitstream, two positive offsets ($\phi_{offset}$, $s_{offset}$, $\lambda_{offset}$) associated with the coordinates of the two-dimensional space.

16. The method of claim 15, wherein decoding one of the positive offsets ($\lambda_{offset}$) comprises decoding a first positive value ($\lambda_{offset,1}$) and a second positive value ($\lambda_{offset,2}$) whose the sum is equal to the positive offset ($\lambda_{offset}$).

17. The method of claim 16, wherein decoding the first or the second positive value comprises entropy decoding a series of binary data representing the first or second positive value.

18. The method of claim 16, wherein decoding the other positive offset (Øoffset, $s_{offset}$) comprises entropy decoding a series of binary data representing the other positive offset.

* * * * *